(12) United States Patent
Sarangi et al.

(10) Patent No.: US 10,597,567 B2
(45) Date of Patent: Mar. 24, 2020

(54) ABRASIVE ARTICLE INCLUDING UNAGGLOMERATED ABRASIVE PARTICLE INCLUDING SILICON CARBIDE AND AN INORGANIC BOND MATERIAL

(71) Applicants: SAINT-GOBAIN ABRASIVES, INC., Worcester, MA (US); SAINT-GOBAIN ABRASIFS, Conflans-Sainte-Honorine (FR)

(72) Inventors: Nilanjan Sarangi, Shrewsbury, MA (US); Sandhya Jayaraman Rukmani, Shrewsbury, MA (US); Stephen E. Fox, Worcester, MA (US)

(73) Assignees: SAINT-GOBAIN ABRASIVES, INC., Worcester, MA (US); SAINT-GOBAIN ABRASIFS, Conflans-Sainte-Honorine (FR)

( * ) Notice: Subject to any disclaimer, the term of this patent is extended or adjusted under 35 U.S.C. 154(b) by 0 days.

(21) Appl. No.: 16/144,799

(22) Filed: Sep. 27, 2018

(65) Prior Publication Data
US 2019/0100683 A1    Apr. 4, 2019

(51) Int. Cl.
*C09K 3/14* (2006.01)
*B24D 3/18* (2006.01)

(52) U.S. Cl.
CPC .............. *C09K 3/1427* (2013.01); *B24D 3/18* (2013.01)

(58) Field of Classification Search
CPC ... B24D 3/00; B24D 3/14; B24D 3/18; C09K 3/14; C09K 3/1427
See application file for complete search history.

(56) References Cited

U.S. PATENT DOCUMENTS

| | | | |
|---|---|---|---|
| 1,546,115 A | 7/1925 | Beecher et al. |
| 2,216,728 A | 10/1940 | Benner et al. |
| 3,183,071 A | 5/1965 | Rue et al. |
| 4,311,489 A | 1/1982 | Kressner |
| 4,364,746 A | 12/1982 | Bitzer et al. |
| 4,575,384 A | 3/1986 | Licht et al. |
| 5,118,326 A | 6/1992 | Lee et al. |
| 5,711,774 A | 1/1998 | Sheldon |
| 6,220,933 B1 | 4/2001 | Shih et al. |
| 9,908,217 B2 | 3/2018 | Sarangi et al. |
| 9,914,198 B2 | 3/2018 | Sarangi et al. |
| 2011/0131889 A1 | 6/2011 | Querel et al. |
| 2013/0152482 A1 | 6/2013 | Sarangi et al. |
| 2014/0311472 A1 | 10/2014 | Tian et al. |
| 2016/0151885 A1 | 6/2016 | Sarangi et al. |
| 2016/0151886 A1 | 6/2016 | Sarangi et al. |
| 2018/0133866 A1 | 5/2018 | Sarangi et al. |

FOREIGN PATENT DOCUMENTS

WO    2014004982 A1    1/2014

OTHER PUBLICATIONS

International Search Report and Written Opinion for PCT/US2018/053184, dated Jan. 28, 2019, 14 pages.

*Primary Examiner* — Pegah Parvini
(74) *Attorney, Agent, or Firm* — Abel Schillinger, LLP; Alex Plache

(57) ABSTRACT

An abrasive article including a body having a bond material extending throughout the body and including at least 8 wt % aluminum oxide ($Al_2O_3$) for a total weight of the bond material, and also including unagglomerated abrasive particles including silicon carbide (SiC) contained within the bond material and present in an amount of greater than 30 vol % for a total volume of the body.

20 Claims, 5 Drawing Sheets

ABRASIVE ARTICLE INCLUDING UNAGGLOMERATED ABRASIVE PARTICLE INCLUDING SILICON CARBIDE AND AN INORGANIC BOND MATERIAL

CROSS-REFERENCE TO RELATED APPLICATION

This application claims priority under 35 U.S.C. § 119(e) to U.S. Patent Application No. 62/564,781 entitled "ABRASIVE ARTICLE INCLUDING AGGLOMERATES HAVING SILICON CARBIDE AND AN INORGANIC BOND MATERIAL," by Nilanjan SARANGI et al., filed Sep. 28, 2017, which is assigned to the current assignee hereof and incorporated herein by reference in its entirety.

FIELD OF THE DISCLOSURE

The following is directed to abrasive articles, and particularly, abrasive articles including a bond material and unagglomerated abrasive particles including silicon carbide.

DESCRIPTION OF THE RELATED ART

Grinding of titanium has proven to be difficult and various types of bonded abrasive articles have been contemplated. U.S. Pat. No. 2,216,728 discloses the formation of aggregates of a plurality of smaller grains of diamond or boron carbide held in the aggregate by a bond which may be a metal, clay, glass or an organic polymer. The method of formation of the aggregates will vary slightly depending on the nature of the bonding medium employed. If metal is the bond then the metal powder and fine abrasive particles, e.g. diamond, are mixed together and hot pressed at a temperature of from 700° to 1500° depending on the metal used. Ceramic bonded aggregates are made by mixing about 5% clay with 95% fine abrasive grain with the usual liquid to give the mixture the needed consistency. The mix is then fired at for example 1250° C. to vitrify the clay bond.

U.S. Pat. No. 3,183,071 discloses bonded particles of very fine crystalline alumina having a particle size of less than 5 microns. Abrasive pellets of various cross sections are formed by extruding mixtures of fine alumina particles and a bond, cutting the extrudate at the desired size, and firing the green pellets. The bond is a silicate glass which has a final fired weight composition of 10-25% alumina, 50-70% silica, 5-15% calcia, 10-20% magnesia, and up to about 3% impurities. The fired pellets are bonded into a grinding wheel and used to snag grind stainless steel.

U.S. Pat. No. 4,364,746 discloses prebonded abrasive aggregates made up of fine particles of an abrasive material such as alumina or silicon carbide bonded into the larger abrasive particles by a resin or polymer. Aggregate particles of different strengths are made by incorporating various types and amounts of filler materials in the resin or polymer binder used to hold the fine abrasive particles together to form the larger abrasive agglomerates.

U.S. Pat. No. 5,711,774 discloses a vitreous bonded abrasive grinding wheel for grinding of titanium-containing materials. The wheel includes silicon carbide abrasive grain, hollow ceramic spheres, and a low temperature, high strength bond. The wheel apparently has improved performance characteristics due to a lowered content of lithium oxide in the bond and use of ceramic pore formers.

U.S. Pat. No. 4,575,384 discloses an abrasive product for grinding titanium metal and its alloy. The product used to grind the titanium consists of a grinding wheel wherein the abrasive grains are aggregates of silicon carbide particles bonded together with a refractory bond such as silicon oxynitride or a silicate based material.

U.S. Pat. No. 5,118,326 discloses a vitreous bonded abrasive grinding wheel for grinding of titanium-containing materials. The wheel includes a blend of silicon carbide and alumina abrasive grain.

The disclosed abrasive aggregates are also utilized with the more conventional type abrasive grains such as fused crushed alumina, alumina-zirconia and the like, including silicon carbide, boron carbide and the diamond.

SUMMARY

According to one aspect, an abrasive article includes a body having a bond material extending throughout the body, wherein the bond material comprises at least 8 wt % aluminum oxide (Al2O3) for a total weight of the bond material and unagglomerated abrasive particles comprising silicon carbide (SiC) contained within the bond material and present in an amount of greater than 30 vol % for a total volume of the body.

According to another aspect, an abrasive article comprises a body including a bond material extending throughout the body, wherein the bond material comprises a vitreous material and the body comprises greater than 12 vol % bond material for the total volume of the body and unagglomerated abrasive particles comprising silicon carbide (SiC) contained within the bond material and present in an amount of greater than 30 vol % for a total volume of the body.

In yet another aspect, an abrasive article comprises a body including a bond material extending throughout the body, wherein the bond material comprises a vitreous material and the body comprises greater than 3 vol % and not greater than 20 vol % bond material for the total volume of the body, and wherein the bond material further comprises at least 8 wt % aluminum oxide (Al2O3) for a total weight of the bond material, greater than 16 wt % boron oxide (B2O3) for a total weight of the bond material, and not greater than 32 wt % zircon (ZrSiO4) for a total weight of the bond material, and further wherein the body includes a porosity present in an amount of at least 15 vol % and not greater than 40 vol % for a total volume of the body, and further including unagglomerated abrasive particles comprising silicon carbide (SiC) contained within the bond material and present in an amount of greater than 30 vol % and not greater than 60 vol % for a total volume of the body.

BRIEF DESCRIPTION OF THE DRAWINGS

The present disclosure may be better understood, and its numerous features and advantages made apparent to those skilled in the art by referencing the accompanying drawings.

DETAILED DESCRIPTION

The following is directed to abrasive articles including bonded abrasive articles suitable for grinding of various types of workpieces, including but not limited to metals, metal alloys and the like. In certain instances, the abrasive articles of the embodiments herein are suitable for removing material from titanium-containing metals, including but not limited to, titanium-based metals and titanium-based metal alloys, such as titanium aluminum alloys (i.e., TiAl metal). Of the many metals and alloys of commercial importance, titanium metal and its alloys can be the most difficult to process via grinding. Titanium-containing metals, including titanium-based metals and titanium-based metal alloys can be an extremely difficult to grind because it is highly susceptible to oxidation, especially at elevated temperatures such as those created during grinding. The oxidation reaction is highly exothermic thereby generating a substantial amount of heat which is additive with the normal heat of grinding experienced grinding any metal. To compound the problem, titanium-based metals generally have relatively low thermal conductivity as compared with the ferrous metals, which results in a greater concentration of heat at the grinding surface. Abrasive articles including silicon carbide abrasive particles have been found to be advantageous relative to certain oxide-based abrasive particles because the silicon carbide particles are resistant to dissolution due to the heat created during grinding.

Figure 1:
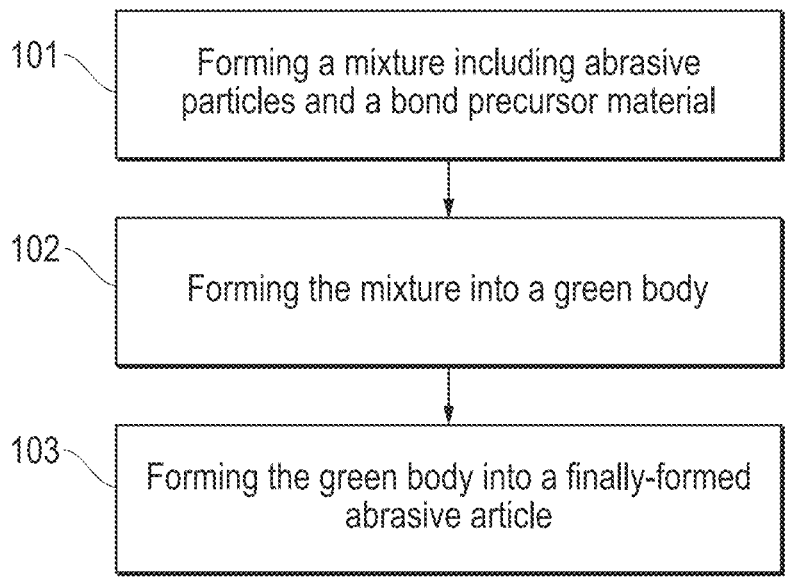
FIG. 1 includes a flow chart providing a process of forming an abrasive article according to an embodiment.
Figure 2:
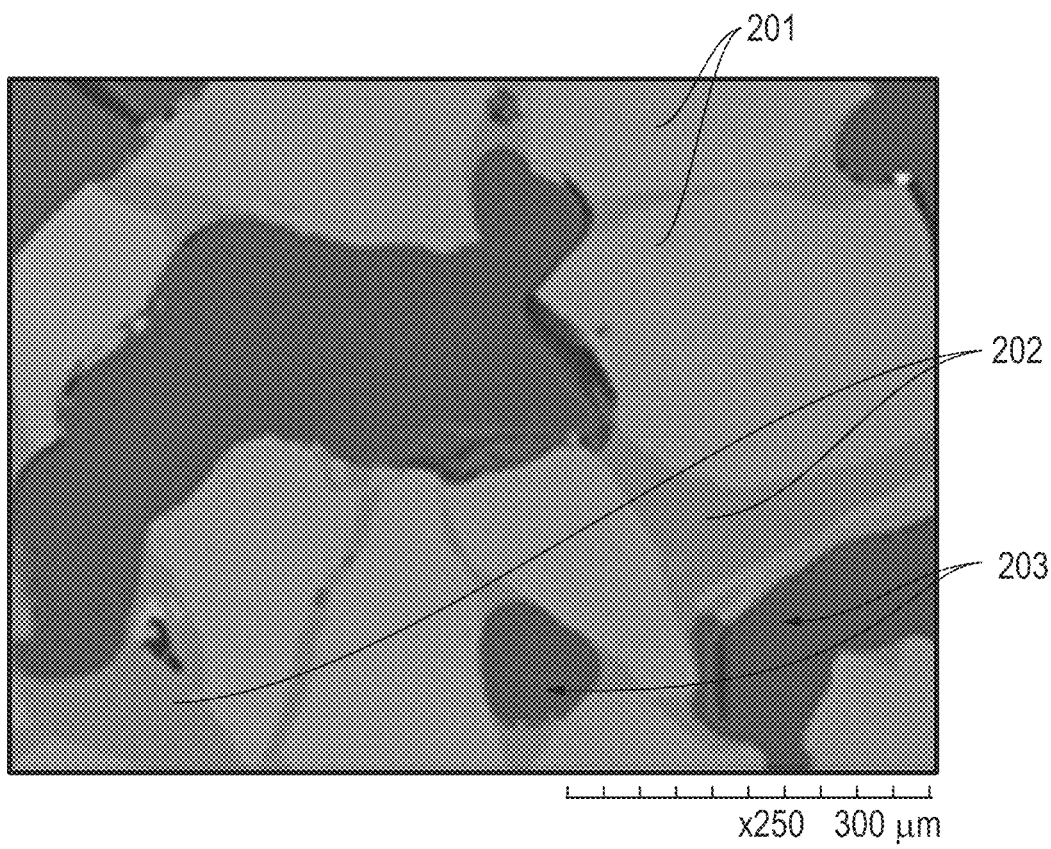
FIG. 2 includes an image of a portion of an abrasive article according to an embodiment.

FIG. 1 includes a flowchart illustrating a process of forming an abrasive article in accordance with an embodiment. As illustrated, at step 101, the process can be initiated by forming a mixture including abrasive particles and a bond material or bond precursor material.

In accordance with an embodiment, the abrasive particles can include silicon carbide. More particularly, the abrasive particles can be silicon carbide-based material such that a majority content of the abrasive particles includes silicon carbide. In still another embodiment, the abrasive particles can consist essentially of silicon carbide, and more particularly, unagglomerated silicon carbide. For certain embodiments, the abrasive particles can be free of oxides, borides, nitrides or any combination thereof. In still another embodiment, the abrasive particles can be free of aluminum oxide or diamond.

The bond material or bond precursor material may include a powder material that may form the bond material of the finally-formed abrasive particle. In one embodiment, the bond precursor material can include a frit. The bond precursor material can include an inorganic material, such as a ceramic material. As used herein, a reference to a ceramic can include a composition including at least one metal element and at least one non-metal element. For example, a ceramic may include material such as oxides, carbides, nitrides, borides, and a combination thereof. More particularly, a ceramic material may have a vitreous phase, crystalline phase, polycrystalline phase, and a combination thereof.

The bond precursor material can include an oxide-based composition, which may include some content of silica (i.e., silicon dioxide), boron oxide, alumina (i.e., aluminum oxide), zircon, sodium oxide, potassium oxide, iron oxide, titanium oxide, magnesium oxide, calcium oxide, and the like. Contents of the bond material of the finally-formed bonded abrasive body are disclosed in more details hereinafter. The composition of the bond precursor material and the bond material of the finally-formed bonded abrasive body can be substantially the same (i.e., 5% or less difference in any one of the components between the precursor bond material and bond material of the finally-formed bonded abrasive body) or essentially the same (i.e., 1% or less difference in any one of the components between the precursor bond material and bond material of the finally-formed bonded abrasive body).

In accordance with an embodiment, the abrasive particles can be unagglomerated particles, which are distinct from agglomerates or aggregates. Agglomerates or aggregates typically include a plurality of abrasive particles bonded to each other by a binder phase. Unagglomerated abrasive particles do not include a binder phase, but are discrete monocrystalline or polycrystalline bodies. According to one embodiment, the unagglomerated abrasive particles can have an average particle size (D50) of at least 0.1 microns, such as at least 1 micron, at least 5 microns, at least 10 microns, at least 20 microns, at least 30 microns, at least 40 microns or even at least 50 microns. Still, in another non-limiting embodiment, the abrasive particles can have an average particle size (D50) of not greater than 2600 microns or not greater than 2550 microns or not greater than 2500 microns or not greater than 2300 microns or not greater than 2000 microns or not greater than 1800 microns or not greater than 1500 microns or not greater than 1200 microns or not greater than 1000 microns or not greater than 800 microns or not greater than 600 microns or not greater than 300 microns or not greater than 200 microns or not greater than 150 microns or not greater than 100 microns. It will be appreciated that the unagglomerated abrasive particles can have an average particle size within a range including any of the minimum and maximum values noted above. In at least one embodiment, the mixture can be essentially free of any agglomerated abrasive particles.

According to a particular embodiment, the mixture including the bond precursor material and the abrasive particles may also include one or more filler materials. The filler material can be distinct from the abrasive particles and may have a hardness less than a hardness of the abrasive particles. The filler material may provide improved mechanical properties and facilitate formation of the abrasive article. The filler material may also be distinct from compositions contained within bond precursor material. In at least one embodiment, the filler material can include various materials, such as fibers, woven materials, non-woven materials, particles, minerals, nuts, shells, oxides, alumina, carbide, nitrides, borides, organic materials, polymeric materials, naturally occurring materials, and a combination thereof. In particular instances, the filler material can include a material such as wollastonite, mullite, steel, iron, copper, brass, bronze, tin, aluminum, kyanite, alusite, garnet, quartz, fluoride, mica, nepheline syenite, sulfates (e.g., barium sulfate), carbonates (e.g., calcium carbonate), cryolite, glass, glass fibers, titanates (e.g., potassium titanate fibers), zircon, rock wool, clay, sepiolite, an iron sulfide (e.g., $Fe_2S_3$, $FeS_2$, or a combination thereof), fluorspar ($CaF_2$), potassium sulfate ($K_2SO_4$), graphite, potassium fluoroborate ($KBF_4$), potassium aluminum fluoride ($KAlF_4$), zinc sulfide (ZnS), zinc borate, borax, boric acid, fine alundum powders, P15A, bubbled alumina, cork, glass spheres, silver, Saran™ resin, paradichlorobenzene, oxalic acid, alkali halides, organic halides, and attapulgite.

Formation of the mixture can include forming a dry or wet mixture. It may be suitable to create a wet mixture to facilitate suitable dispersion of the abrasive particles within the bond precursor material. Moreover, it will be appreciated that the mixture can include other materials, including for example a filler, additives, binders, and any other materials known in the art to facilitate formation of a mixture to create a green product prior to formation of the abrasive article. In at least one embodiment, the mixture can be essentially free of a pore former.

In accordance with an embodiment, the bond precursor material can include zircon. In at least one particular embodiment, the bond precursor material may include at least 0.5 wt % zircon for the total weight of the mixture.

The bond precursor material can have a particular melting temperature that may facilitate suitable formation and performance of the abrasive article. In at least one instance, the bond precursor material can have a melting temperature that is at least 800° C., such as at least 825° C. or at least 850° C. or at least 875° C. or at least 900° C. or at least 925° C. or at least 950° C. or at least 975° C. or at least 1000° C. or at least 1025° C. or at least 1050° C. Still, in one non-limiting embodiment the melting temperature of the bond precursor material can be not greater than 1100° C., such as not greater than 1050° C. or not greater than 1000° C. or not greater than 950° C. or not greater than 925° C. It will be appreciated that the melting temperature can be within a range including any of the minimum and maximum temperatures noted above.

In certain instances, the mixture may include a secondary particle, such as a filler or secondary abrasive particle. The secondary abrasive particle can include a material such as an oxide, a carbides, a nitride, a boride, a carbon-based materials (e.g., diamond), an oxycarbides, an oxynitrides, an oxyborides, or any combination thereof. In certain instances, the secondary abrasive particle can be particularly hard, having for example, a Mohs hardness of at least 6, such as at least 6.5, at least 7, at least 8, at least 8.5, at least 9. According to one embodiment, the secondary abrasive particles can include a superabrasive material. The secondary abrasive particles can include a material selected from the group of silicon dioxide, silicon carbide, alumina, zirconia, flint, garnet, emery, rare earth oxides, rare earth-containing materials, cerium oxide, sol-gel derived particles, gypsum, iron oxide, glass-containing particles, and a combination thereof. In another instance, secondary abrasive particle may also include silicon carbide (e.g., Green 39C and Black 37C), brown fused alumina (57A), seeded gel abrasive, sintered alumina with additives, shaped and sintered aluminum oxide, pink alumina, ruby alumina (e.g., 25A and 86A), electrofused monocrystalline alumina 32A, MA88, alumina zirconia abrasives (NZ, NV, ZF), extruded bauxite, cubic boron nitride, diamond, abral (aluminum oxy-nitride), sintered alumina (Treibacher's CCCSK), extruded alumina (e.g., SR1, TG, and TGII), or any combination thereof. The secondary abrasive particles may be diluent grains, having a hardness less than the abrasive particles, but still harder than filler materials that may be present in the abrasive article. In still other instances, the secondary abrasive particles may include shaped abrasive particles, which unlike crushed grains, each of the shaped abrasive particles can have a precise and substantially similar shape relative to each other.

Referring again to FIG. 1, after forming the mixture, the process can continue at step 102 forming the mixture into a green body. The process of forming the mixture into a green body can include pressing, molding, casting, cutting, printing, curing, depositing, drying, heating, cooling, or any combination thereof.

Referring again to FIG. 1, after forming the green body at step 102, the process can continue at step 103 by forming the green body into the finally-formed abrasive article. In certain instances, the process of forming the green body and the process for forming the finally-formed abrasive article can be combined, such that the mixture is converted directly to the finally-formed abrasive article. Suitable processes for forming the finally-formed abrasive article can include pressing, molding, casting, cutting, printing, curing, depositing, drying, heating, cooling, or any combination thereof.

In one particular embodiment, the process for forming the finally-formed abrasive article can include heat treating the mixture. In accordance with an embodiment, the process of heat treating can include heating the mixture to a temperature sufficient to form a vitreous bond material from the bond precursor material. In accordance with an embodiment, heat treating can include heating the mixture to a forming temperature of not greater than 1100° C., such as not greater than 1050° C., or even not greater than 950° C. Still, in at least one non-limiting embodiment, the process of heat treating can include heating the abrasive agglomerates and bond material to a forming temperature of at least 850° C., such as at least 875° C., or even at least 900° C. It will be appreciated that the forming temperature can be within a range including any of the minimum and maximum values noted above. The forming temperature can at or above the melting temperature of the bond precursor material.

Heat treating may further include heating the mixture in a non-oxidizing atmosphere. In at least another embodiment, the process of heat treating can include heating the abrasive agglomerates and bond material in a nitrogen-rich atmosphere, and more particularly an atmosphere that consists essentially of nitrogen. Furthermore, it will be appreciated that a non-oxidizing atmosphere can include one or more noble gases. Still, in another embodiment, the process of heat treating can be conducted in an ambient atmosphere (i.e., air).

After heat treating to form the bonded abrasive body, the bonded abrasive body may be incorporated into an abrasive article. It will be appreciated that the bonded abrasive body may have any suitable size and shape as known in the art and can be incorporated into various types of abrasive articles to form a bonded abrasive article suitable for conducting material removal operations, particularly material removal operations on titanium-containing metal and titanium-containing metal alloys, and more particularly, titanium-based metals and metal alloys, such as titanium aluminide, Ti-6Al-4V and the like. For example, the bonded abrasive body can be attached to a substrate, such as a hub of a wheel to facilitate formation of a bonded abrasive grinding wheel.

The bonded abrasive article disclosed herein may also be used for material removal operations performed on certain other materials, such as a nickel-containing material, which can be for example, nickel-containing metals and nickel-containing metal alloys and particularly include nickel-based metals and metal alloys. In a non-limiting embodiment, the nickel-containing material can include INCONEL® alloy 617, INCONEL® alloy 625, INCONEL® alloy 625LCF®, INCONEL® alloy 706, INCONEL® alloy 718, INCONEL® alloy 718SPF™, INCONEL® alloy 725, INCONEL® alloy X-750, INCONEL® alloy MA754, INCONEL® alloy 783, INCONEL® alloy HX, NILO® alloy 42, NIMONIC® alloy 75, NIMONIC® alloy 80A, NIMONIC® alloy 86, NIMONIC® alloy 90, NIMONIC® alloy 105, NIMONIC® alloy 115, NIMONIC® alloy 901, NIMONIC® alloy PE16, NIMONIC® alloy PK33, NIMONIC® alloy 263, NILO® alloy 36, INCOLOY® alloy 903, INCOLOY® alloy 907, INCOLOY® alloy 909, INCOLOY® alloy A-286, UDIMET® alloy 188, UDIMET® alloy 520, UDIMET® alloy L-605, UDIMET® alloy 720, UDIMET® alloy D-979, UDIMET® alloy R41, Waspaloy, cast iron (e.g., grey cast iron, nodular cast iron, and chilled cast iron).

Certain types of materials other than the titanium-containing material or the nickel-containing material may also be suitable for material removal operations utilizing the bonded abrasive article disclosed herein. In a non-limiting embodiment, such material can include an aluminum-containing material (e.g., aluminum alloys), carbides (e.g., tungsten carbide), stainless steel, non-ferrous metals and alloys (e.g., copper, bronze, tin, brass, zinc, and the like), nitrided metals, rubber, plastics, composites, ceramics, and hardened steel.

As noted, the abrasive article can have a body in the form of a bonded abrasive including abrasive particles 201, bond material 202 in the form of bond bridges joining the abrasive particles 201, and pores 203 extending between the bond material 202 and abrasive particles 201.

The bonded abrasive body may include a particular content of bond material that may facilitate improved performance of the abrasive article. In accordance with an embodiment, the bonded abrasive can have a body including at least 3 vol % bond material for a total volume of the body. In still other embodiments, the bonded abrasive body can include at least 4 vol % bond material, such as at least 5 vol % or at least 6 vol % or at least 7 vol % or at least 8 vol % or at least 9 vol % or at least 10 vol % or at least 11 vol % or at least 12 vol % or at least 13 vol % or at least 14 vol % or at least 15 vol % or at least 16 vol % or at least 17 vol % or at least 18 vol % or at least 19 vol % bond material for a total volume of the body. In yet another non-limiting embodiment, the body of the bonded abrasive can have not greater than 20 vol % bond material for the total volume of the body, such as not greater than 19 vol % or not greater than 18 vol % or not greater than 17 vol % or not greater than 16 vol % or not greater than 15 vol % or not greater than 14 vol % or not greater than 13 vol % or not greater than 12 vol % or not greater than 11 vol % or not greater than 10 vol % or not greater than 9 vol % or not greater than 8 vol % or not greater than 7 vol % or not greater than 6 vol % or not greater than 5 vol % or not greater than 4 vol % bond material for a total volume of the body. It will be appreciated that the bonded abrasive body can have a bond material content within a range including any of the minimum and maximum percentages noted above.

In accordance with another embodiment, the bonded abrasive body may have a particular content of porosity and type of porosity that may facilitate improved performance of the abrasive article. In accordance with an embodiment the body can include at least 15 vol % porosity for a total volume of the body. In a more particular embodiment, the body can include at least 16 vol % porosity for the total volume of the body, such as at least 17 vol % or at least or at least 18 vol % or at least 19 vol % or at least 20 vol % or at least 21 vol % or at least 22 vol % or at least 23 vol % or at least 24 vol % or at least 25 vol % or at least 26 vol % or at least 27 vol % or at least 28 vol % or at least 29 vol % or at least 30 vol % or at least 31 vol % or at least 32 vol % or at least 33 vol % or at least 34 vol % or at least 35 vol % or at least 36 vol % or at least 37 vol % or at least 38 vol % or at least 39 vol % for a total volume of the body. Still, in other non-limiting embodiment, the body may include not greater than 39 vol % for the total volume of the body, such as not greater than 38 vol % or not greater than 37 vol % or not greater than 36 vol % or not greater than 35 vol % or not greater than 34 vol % or not greater than 33 vol % or not greater than 32 vol % or not greater than 31 vol % or not greater than 30 vol % or not greater than 29 vol % or not greater than 28 vol % or not greater than 27 vol % or not greater than 26 vol % or not greater than 25 vol % or not greater than 24 vol % or not greater than 23 vol % or not greater than 22 vol % or not greater than 21 vol % or not greater than 20 vol % or not greater than 19 vol % or not greater than 18 vol % or not greater than 17 vol % or not greater than 16 vol % for a total volume of the body. It will be appreciated that the body can include a content of porosity within a range including any of the minimum and maximum percentages noted above.

The bonded abrasive body of the embodiments herein may have a particular permeability and porosity that can facilitate improved performance of the abrasive article. For example, the body may include porosity, wherein at least 20% of the total porosity of the body can be interconnected porosity. Interconnected porosity defines a series of interconnected channels extending through the body. Interconnected porosity may also be referred to herein as open porosity. Open porosity or interconnected porosity can be distinct from closed porosity, which is defined as discrete pores within the body that are not connected to adjacent pores and do not form an interconnected network of channels through the body. Closed porosity does not allow a fluid to flow freely through the volume of the body. In another instance, the body can include at least 30%, such as at least 40%, at least 50%, at least 60%, at least 70%, at least 80%, at least 90%, or even at least 95% interconnected porosity for the total volume or porosity in the body. In at least one embodiment, essentially all the porosity of the body can be interconnected porosity. Still, in at least one non-limiting embodiment, the body can have not greater than 99%, such as not greater than 95%, or even not greater than 90% of the total porosity may be interconnected porosity. It will be appreciated that the body can include a content of interconnected porosity within a range including any of the minimum and maximum values noted above.

In accordance with an embodiment, the bonded abrasive body can have particularly large pores, which can facilitate improved performance. For example, the body can have an average pore size of at least about 40 microns, such as at least 50 microns or at least 60 microns or at least 70 microns or at least 80 microns or at least 85 microns or at least 90 microns or at least 95 microns or at least 100 microns or at least 110 microns or at least 120 microns or at least 130 microns or at least 140 microns or at least 150 microns or or even at least 160 microns. Still, in another non-limiting embodiment, the body can have an average pore size of not greater than 2000 microns, such as not greater than 1500 microns, not greater than 1000 microns, not greater than 900 microns, not greater than 800 microns or even not greater than 700 microns. It will be appreciated that the body can have an average pore size within a range including any of the minimum and maximum values noted above. Moreover, the average pore size can be measured using ASTM standard E112 Standard Test Methods for Determining Average Grain Size. Cross-sectional images of the body were viewed at 60× magnification on a Hitachi Microscope. The macro to determine pore length follows a technique to measure crystal size based on including drawing 6 equally spaced lines on the image and determining the regions of the line that intersect with a pore. The regions of the lines that intersect the pore are measured. This process was repeated for seven different images of portions of the bonded abrasive body. After all images were analyzed the values were averaged to calculate the average pore size. Moreover, it will be appreciated that reference to the average pore size can also be reference to a mean pore size.

In accordance with an embodiment, the bonded abrasive body can have particular median pore size that can facilitate improved performance. For example, the body can have a median pore size of at least about 20 microns, such as at least 30 microns or at least 35 microns or at least 40 microns or at least 45 microns or at least at least 50 microns or at least 55 microns or at least 60 microns or at least 65 microns or at least 70 microns or at least 75 microns or at least 80 microns or even at least 85 microns. Still, in another non-limiting embodiment, the body can have a median pore size of not greater than 2000 microns, such as not greater than 1500 microns, not greater than 1000 microns, not greater than 900 microns, not greater than 800 microns or even not greater than 700 microns, not greater than 500 microns or even not greater than 200 microns. It will be appreciated that the body can have a median pore size within a range including any of the minimum and maximum values noted above. Moreover, the median pore size can be measured using ASTM standard E112 Standard Test Methods for Determining Average Grain Size.

For certain other embodiments, the bonded abrasive body can have an upper quartile pore size limit, which defines the smallest pore size defining the largest 25% of pores in the body (i.e., pore sizes of 75% to 100% of all pore sizes in the body). Stated alternatively, the upper quartile pore size limit is the pore size of pores at the $75^{th}$ percentile for the pore size distribution of the body obtained by a suitable statistical sampling of the body measured using ASTM standard E112. For example, the body can have an upper quartile pore size limit pore size of at least about 85 microns, such as at least at least 90 microns, at least 100 microns, at least 110 microns, at least 120 microns, at least 130 microns, at least 140 microns, at least 150 microns, at least 160 microns, at least 170 microns, at least 180 microns, at least 190 microns or even at least 200 microns. Still, in another non-limiting embodiment, the body can have an upper quartile pore size limit of not greater than 2000 microns, such as not greater than 1500 microns, not greater than 1000 microns, not greater than 900 microns, not greater than 800 microns, not greater than 700 microns or even not greater than 500 microns. It will be appreciated that the body can have an upper quartile pore size limit within a range including any of the minimum and maximum values noted above.

In one embodiment, the bonded abrasive body can also have a particular pore size standard deviation that can facilitate improved performance of the abrasive article. The pore size standard deviation can be determined from measuring the pore size distribution of the body obtained by a suitable statistical sampling of the body measured using ASTM standard E112 and calculating the standard deviation from the pore size data. For example, the body can have a pore size standard deviation of at least about 85 microns, such as at least at least 90 microns, at least 100 microns, at least 110 microns, at least 120 microns, at least 130 microns, at least 140 microns, at least 150 microns, at least 160 microns, at least 170 microns, at least 180 microns, at least 190 microns or even at least 200 microns. Still, in another non-limiting embodiment, the porosity of the body can have a pore size standard deviation of not greater than 2000 microns, such as not greater than 1500 microns, not greater than 1000 microns, not greater than 900 microns, not greater than 800 microns, not greater than 700 microns, not greater than 500 microns or even not greater than 400 microns. It will be appreciated that the porosity of the body can have a pore size standard deviation within a range including any of the minimum and maximum values noted above.

In another embodiment, the bonded abrasive body can also have a particular pore size variance that can facilitate improved performance of the abrasive article. The pore size variance can be determined from measuring the pore size distribution of the body obtained by a suitable statistical sampling of the body measured using ASTM standard E112 and calculating the variance from the pore size data. For example, the body can have a pore size variance of at least about 10 microns$^2$, such as at least at least 15 microns$^2$, at least 20 microns$^2$, at least 25 microns$^2$, at least 30 microns$^2$, at least 35 microns$^2$ or even at least 40 microns$^2$. Still, in another non-limiting embodiment, the porosity of the body can have a pore size variance of not greater than 1000 microns$^2$, such as not greater than 500 microns$^2$, not greater than 200 microns$^2$, not greater than 100 microns$^2$, not greater than 90 microns$^2$, not greater than 80 microns$^2$ or even not greater than 70 microns$^2$. It will be appreciated that the porosity of the body can have a pore size variance within a range including any of the minimum and maximum values noted above.

According to an embodiment, the bonded abrasive body can also have a particular maximum pore size that can facilitate improved performance of the abrasive article. The maximum pore size can be obtained by a suitable statistical sampling of the body measured using ASTM standard E112 and determining the maximum pore size measured. For example, the body can have a maximum pore size of at least about 590 microns, such as at least at least 600 microns, at least 700 microns, at least 800 microns, at least 900 microns, at least 1000 microns, at least 1200 microns, at least 1500 microns, at least 1700 microns or even at least 2000 microns. Still, in another non-limiting embodiment, the body can have a maximum pore size of not greater than 6000 microns, such as not greater than 5500 microns, not greater than 5000 microns, not greater than 4500 microns, not greater than 4000 microns or even not greater than 3500 microns. It will be appreciated that the body can have a maximum pore size within a range including any of the minimum and maximum values noted above.

In still another instance, the body may include a particular content of abrasive particles 201, and particularly, unagglomerated abrasive particles, which may facilitate improved performance of the abrasive article. For example, the body may include at least 31 vol % unagglomerated abrasive particles for a total volume of the body, such as at least 32 vol % or at least or at least 33 vol % or at least 34 vol % or at least 35 vol % or at least 36 vol % or at least 37 vol % or at least 38 vol % or at least 39 vol % or at least 40 vol % or at least 41 vol % or at least 42 vol % or at least 43 vol % or at least 44 vol % or at least 45 vol % or at least 46 vol % or at least 47 vol % or at least 48 vol % or at least 49 vol % or at least 50 vol % or at least 51 vol % or at least 52 vol % or at least 53 vol % or at least 54 vol % or at least 55 vol % or at least 56 vol % or at least 57 vol % or at least 58 vol % or at least 59 vol % for a total volume of the body for a total volume of the body. Still, in one non-limiting embodiment, the content of unagglomerated abrasive particles in the body can be not greater than 60 vol % for a total volume of the body, such as not greater than 59 vol % or not greater than 58 vol % or not greater than 57 vol % or not greater than 56 vol % or not greater than 55 vol % or not greater than 54 vol % or not greater than 53 vol % or not greater than 52 vol % or not greater than 51 vol % or not greater than 50 vol % or not greater than 49 vol % or not greater than 48 vol % or not greater than 47 vol % or not greater than 46 vol % or not greater than 45 vol % or not greater than 44 vol % or not greater than 43 vol % or not greater than 42 vol % or not greater than 41 vol % or not greater than 40 vol % or not greater than 39 vol % or not greater than 38 vol % or not greater than 37 vol % or not greater than 36 vol % or not greater than 35 vol % or not greater than 34 vol % or not greater than 33 vol % or not greater than 32 vol % for a total volume of the body. It will be appreciated that the total content of unagglomerated abrasive particles within the body can be within range including any of the minimum and maximum percentages noted above.

In another aspect, the body may include a limited content of agglomerated abrasive particles. For example, the body may include not greater than 10 vol % agglomerated abrasive particles for a total volume of the body. In other instances, the content of agglomerated abrasive particles can be not greater than 8 vol %, such as not greater than 6 vol % or not greater than 5 vol % agglomerated abrasive particles for a total volume of the body or not greater than 4 vol % or not greater than 3 vol % or not greater than 2 vol % or not greater than 1 vol % for a total volume of the body. In one particular embodiment, the body can be essentially free of agglomerated abrasive particles. In still another embodiment, essentially all of the abrasive particles in the body are unagglomerated abrasive particles.

In certain instances, the bonded abrasive body may include a content of ceramic pore formers contained within the bond material. For example, the body may include a ceramic pore former present in an amount of not greater than about 5 vol % for a total volume of the body. In other instances, the content of the ceramic pore former may be less, such as not greater than 4.5 vol %, such as not greater than 4 vol %, not greater than 3.5 vol %, not greater than 3 vol %, not greater than 2.5 vol %, not greater than 2 vol %, not greater than 1.5 vol %, not greater than 1 vol %, or even not greater than 0.5 vol % for the total volume of the body. In at least one instance, the body may be essentially free of a ceramic pore former, or any pore forming material. Still, in another non-limiting embodiment, the bonded abrasive body may include a minimum content of a pore former, such as a ceramic pore former, such that the body can include at least 0.2 vol %, such as at least 0.5 vol %, at least 0.8 vol %, or even at least 1 vol % of a pore former, such as ceramic pore former, for the total volume of the body. It will be appreciated that the body may include a content of a pore former within a range including any of the minimum and maximum percentages noted above.

The bond material of the abrasive article may have a particular bond chemistry that may facilitate improved manufacturing and performance of the abrasive article. For example, the bond material can be a vitreous material, polycrystalline material, or a combination thereof. In one embodiment, the bond material can consist essentially of a vitreous material.

In more particular instances, the bond material may include a certain content of alumina ($Al_2O_3$ or aluminum oxide) for a total weight of the bond material, which may facilitate suitable formation and/or performance of the abrasive article. For example, the bond material of the bonded abrasive body may include at least 8 wt %, such as at least 9 wt %, at least 10 wt %, at least 11 wt %, at least 13 wt %, at least 15 wt %, or even at least 16.5 wt % for total weight of the bond material. Still, in one non-limiting embodiment, the bond material of the bonded abrasive body may include not greater than 25 wt % alumina for a total weight of the bond material, such as not greater than 24 wt % or not greater than 23 wt % or not greater than 22 wt % or not greater than 21 wt % or not greater than 20 wt % or not greater than 19 wt % or not greater than 18 wt % or not greater than 17 wt % or not greater than 16 wt % alumina for the total weight of the bond material. It will be appreciated that the content of alumina within the bond material may be within range between any of the minimum and maximum percentages noted above.

In at least one embodiment, the bond material may include a particular content of aluminum and alumina that can facilitate formation and improved performance of the abrasive article. For example, the bond material can include at least 4 wt % alumina and aluminum metal ($Al_2O_3/Al$) for a total weight of the bond material. In still other instances, the bond material can include at least 5 wt %, such as at least 6 wt % or even at least 7 wt % alumina and aluminum metal ($Al_2O_3/Al$) for a total weight of the bond material. In another non-limiting embodiment, the bond material can include not greater than 22 wt %, such as not greater than 21 wt %, not greater than 20 wt %, not greater than 19 wt %, not greater than 18 wt %, not greater than 17 wt %, not greater than 16 wt %, or even not greater than 15 wt % alumina and aluminum metal for a total weight of the bond material. It will be appreciated that the bond material can include a content of alumina and aluminum metal within a range including any of the minimum and maximum values noted above.

In accordance with an embodiment, the bond material can include a particular content of boron oxide ($B_2O_3$) that may facilitate formation of the abrasive article and improve performance. For example, the bond material may include at least 16 wt %, such as at least 17 wt % or at least 18 wt % or at least 19 wt % or at least 20 wt % or at least 21 wt % or at least 22 wt % or at least 23 wt % or at least 24 wt % or at least 25 wt % or at least 26 wt % or at least 27 wt % or at least 28 wt % or at least 29 wt % or at least 30 wt % or at least 31 wt % or at least 32 wt % or at least 33 wt % or at least 34 wt % or at least 35 wt % or at least 36 wt % or at least 37 wt % for a total weight of the bond material. Still, in at least one non-limiting embodiment, the bond material may include not greater than 50 wt % boron oxide ($B_2O_3$) for a total weight of the bond material, such as not greater than 49 wt % or not greater than 48 wt % or not greater than 47 wt % or not greater than 46 wt % or not greater than 45 wt % or not greater than 44 wt % or not greater than 43 wt % or not greater than 42 wt % or not greater than 41 wt % or not greater than 40 wt % or not greater than 39 wt % or not greater than 38 wt % or not greater than 37 wt % or not greater than 36 wt % or not greater than 35 wt % or not greater than 34 wt % or not greater than 33 wt % or not greater than 32 wt % or not greater than 31 wt % or not greater than 30 wt % or not greater than 29 wt % or not greater than 28 wt % or not greater than 27 wt % or not greater than 26 wt % or not greater than 25 wt % or not greater than 24 wt % or not greater than 23 wt % or not greater than 22 wt % or not greater than 21 wt % or not greater than 20 wt % or not greater than 19 wt % or not greater than 18 wt % for a total weight of the bond material. It will be appreciated that the bond material can include a content of boron oxide within range including any of the minimum and maximum percentages noted above.

In accordance with an embodiment, the bond material can include a particular content of silicon dioxide ($SiO_2$) that may facilitate formation of the abrasive article and improve performance. For example, the bond material may include at least 20 wt %, such as at least 22 wt % or at least 25 wt % or at least 27 wt % or at least 30 wt % or at least 32 wt % or at least 35 wt % or at least 37 wt % or at least 40 wt % or at least 42 wt % or at least 45 wt % or at least 47 wt % or at least 50 wt % or at least 52 wt % for a total weight of the bond material. Still, in at least one non-limiting embodiment, the bond material may include not greater than 65 wt % silicon dioxide ($SiO_2$) for a total weight of the bond material, such as not greater than 63 wt % or not greater than 60 wt % or not greater than 58 wt % or not greater than 56 wt % or not greater than 55 wt % or not greater than 54 wt % or not greater than 53 wt % or not greater than 52 wt % or not greater than 50 wt % or not greater than 48 wt % or not greater than 46 wt % or not greater than 44 wt % or not greater than 40 wt % or not greater than 38 wt % or not greater than 36 wt % or not greater than 34 wt % or even not greater than 32 wt % or not greater than 30 wt % for a total weight of the bond material. It will be appreciated that the bond material can include a content of silicon dioxide within range including any of the minimum and maximum percentages noted above.

According to another embodiment, the bond material may include a particular ratio of a content of alumina relative to the content of boron oxide, such that the bond material comprises a ratio ($Al_2O_3/B_2O_3$) based on weight percent. Such a ratio may facilitate improved formation and/or performance of the abrasive article. In one embodiment the ratio ($Al_2O_3/B_2O_3$) can be not greater than 1.5, such as not greater than 1.2 or not greater than 1 or not greater than 0.9 or not greater than 0.8 or not greater than 0.7 or not greater than 0.6 or not greater than 0.5 or not greater than 0.4. According to one non-limiting embodiment, the ratio ($Al_2O_3/B_2O_3$) can be at least 0.4, such as at least 0.5 or at least 0.6 or at least 0.7 or at least 0.8 or at least 0.9 or at least 1 or at least 1.1. It will be appreciated that the ratio ($Al_2O_3/B_2O_3$) can be within range including any of the minimum and maximum values noted above.

In still another embodiment, the bond material may include a particular ratio of a content of alumina relative to the content of silicon dioxide, such that the bond material comprises a ratio a ratio ($Al_2O_3/SiO_2$), based on weight percent. Such a ratio may facilitate improved formation and/or performance of the abrasive article. In one embodiment the ratio ($Al_2O_3/SiO_2$) can be at least 0.05, such as at least 0.1 or at least 0.2 or at least 0.3 or at least 0.4 or at least 0.5 or at least 0.6 or at least 0.7 or at least 0.8 or at least 0.9. According to one non-limiting embodiment, the ratio ($Al_2O_3/SiO_2$) can be not greater than 1, such as not greater than 0.9 or not greater than 0.8 or not greater than 0.7 or not greater than 0.6 or not greater than 0.5 or not greater than 0.4 or not greater than 0.3 or not greater than 0.2 or not greater than 0.1. It will be appreciated that the ratio ($Al_2O_3/SiO_2$) can be within range including any of the minimum and maximum values noted above.

For another embodiment, the bond material may include a particular ratio of a content of boron oxide relative to the content of silicon dioxide, such that the bond material comprises a ratio ($B_2O_3/SiO_2$), based on weight percent. Such a ratio may facilitate improved formation and/or performance of the abrasive article. In one embodiment the ratio ($B_2O_3/SiO_2$) can be not greater than 1.8, such as not greater than 1.7 or not greater than 1.6 or not greater than 1.5 or not greater than 1.4 or not greater than 1.3 or not greater than 1.2 or not greater than 1.1 or not greater than 1 or not greater than 0.9 or not greater than 0.8 or not greater than 0.7. Still, in one non-limiting embodiment, the ratio ($B_2O_3/SiO_2$) can be at least 0.5, such as at least 0.6 or at least 0.7 or at least 0.8 or at least 0.9 or at least 1 or at least 1.1 or at least 1.2 or at least 1.3 or at least 1.4. It will be appreciated that the ratio ($B_2O_3/SiO_2$) can be within range including any of the minimum and maximum values noted above.

In accordance with an embodiment, the bond material can include a particular content of Zircon ($ZrSiO_4$) that may facilitate formation of the abrasive article and improve performance. For example, the bond material may include at least 1 wt % zircon for the total weight of the bond material. In other embodiments, the bond material can include a greater content of zircon, such as at least 2 wt % or at least 3 wt % or at least 4 wt % or at least 5 wt % or at least 6 wt % or at least 7 wt % or at least 8 wt % or at least 9 wt % or at least 10 wt % or at least 11 wt % or at least 12 wt % or at least 13 wt % or at least 14 wt % or at least 15 wt % or at least 16 wt % or at least 17 wt % or at least 18 wt % or at least 19 wt % or at least 20 wt % or at least 21 wt % or at least 22 wt % or at least 23 wt % or at least 24 wt % or at least 25 wt % or at least 26 wt % or at least 27 wt % or at least 28 wt % or at least 29 wt % for a total weight of the bond material. Still, in at least one non-limiting embodiment, the bond material may include not greater than 30 wt % zicon for a total weight of the bond material, such as not greater than 29 wt % or not greater than 28 wt % or not greater than 27 wt % or not greater than 26 wt % or not greater than 25 wt % or not greater than 24 wt % or not greater than 23 wt % or not greater than 22 wt % or not greater than 21 wt % or not greater than 20 wt % or not greater than 19 wt % or not greater than 18 wt % or not greater than 17 wt % or not greater than 16 wt % or not greater than 15 wt % or not greater than 14 wt % or not greater than 13 wt % or not greater than 12 wt % or not greater than 11 wt % or not greater than 10 wt % or not greater than 9 wt % or not greater than 8 wt % or not greater than 7 wt % or not greater than 6 wt % or not greater than 5 wt % or not greater than 4 wt % or not greater than 3 wt % or not greater than 2 wt % or not greater than 1 wt % for the total weight of the bond material. It will be appreciated that the bond material can include a content of zircon within range including any of the minimum and maximum percentages noted above. According to one particular embodiment, the bond material can be essentially free of zircon ($ZrSiO_4$).

For another embodiment, the bond material may include a particular ratio of a content of boron oxide relative to the content of zircon, such that the bond material comprises a ratio ($ZrSiO_4/B_2O_3$), based on weight percent. Such a ratio may facilitate improved formation and/or performance of the abrasive article. In one embodiment the ratio ($ZrSiO_4/B_2O_3$) can be not greater than 5, such as not greater than 4 or not greater than 3 or not greater than 2 or not greater than 1.8 or not greater than 1.6 or not greater than 1.4 or not greater than 1.2 or not greater than 1 or not greater than 0.8 or not greater than 0.7 or not greater than 0.6 or not greater than 0.5 or not greater than 0.4 or not greater than 0.3 or not greater than 0.2 or not greater than 0.1. Still, in one non-limiting embodiment, the ratio ($ZrSiO_4/B_2O_3$) can be at least 0.05, such as at least 0.1 or at least 0.2 or at least 0.3 or at least 0.4 or at least 0.5 or at least 0.6 or at least 0.7 or at least 0.8 or at least 0.9 or at least 1 or at least 1.2 or at least 1.4 or at least 1.6 or at least 1.8 or at least 2 or at least 2.2 or at least 2.5 or at least 3. It will be appreciated that the ratio ($ZrSiO_4/B_2O_3$) can be within range including any of the minimum and maximum values noted above.

In another embodiment, the bond material can include a particular content of certain components that facilitates suitable formation and/or performance of the abrasive article. Such components can include manganese dioxide ($MnO_2$), magnesium oxide (MgO), calcium oxide (CaO), potassium oxide ($K_2O$), iron oxide ($Fe_2O_3$), titanium dioxide (TiO₂), or any combination thereof. For example, in one instance, the bond material can include not greater than 2 wt % for the total weight of the bond of any one of manganese dioxide (MnO₂), magnesium oxide (MgO), calcium oxide (CaO), potassium oxide (K₂O), iron oxide (Fe₂O₃) or titanium dioxide (TiO₂). In another embodiment, the bond material can include not greater than 1 wt % or even not greater than 0.5 wt % of manganese dioxide (MnO₂), magnesium oxide (MgO), calcium oxide (CaO), potassium oxide (K₂O), iron oxide (Fe₂O₃) or titanium dioxide (TiO₂). In one embodiment, the bond material can be essentially free of any one of or combination of manganese dioxide (MnO₂), magnesium oxide (MgO), calcium oxide (CaO), potassium oxide (K₂O), iron oxide (Fe₂O₃) or titanium dioxide (TiO₂).

In certain instances, the bond material can include a particular total (i.e., sum) content of manganese dioxide (MnO2), magnesium oxide (MgO), calcium oxide (CaO), potassium oxide (K2O), iron oxide (Fe2O3), and titanium dioxide (TiO2). For example, in one instance, the sum of the contents of manganese dioxide (MnO2), magnesium oxide (MgO), calcium oxide (CaO), potassium oxide (K2O), iron oxide (Fe2O3) and titanium dioxide (TiO2) can be not greater than 2 wt % for a total weight of the bond material, such as not greater than 1 wt % or not greater than 0.5 wt %. In a particular embodiment, the bond material can be essentially free of manganese dioxide (MnO₂), magnesium oxide (MgO), calcium oxide (CaO), potassium oxide (K₂O), iron oxide (Fe₂O₃) and titanium dioxide (TiO₂).

According to another aspect, the bond material can include a particular content of sodium oxide, which may facilitate suitable formation and performance of the abrasive article. For example, the bond material can include at least 0.5 wt % sodium oxide (Na₂O) for a total weight of the bond material. In another embodiment, the bond material can include at least 1 wt % sodium oxide for a total weigh to of the bond material, such as at least 2 wt % or at least 3 wt % or at least 4 wt % or at least 5 wt %. In another non-limiting embodiment, the bond material can include not greater than 10 wt % sodium oxide (Na₂O) for a total weight of the bond material, such as not greater than 9 wt % or not greater than 8 wt % or not greater than 7 wt % or not greater than 6 wt % or not greater than 5 wt % or not greater than 4 wt % or not greater than 3 wt % or not greater than 2 wt % or not greater than 1 wt % for the total weight of the bond material. It will be appreciated that the bond material can include a content of sodium oxide within range including any of the minimum and maximum percentages noted above.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

EMBODIMENTS

Embodiment 1

An abrasive article comprising:
a body including:
a bond material extending throughout the body, wherein the bond material comprises at least 8 wt % aluminum oxide (Al2O3) for a total weight of the bond material; and
unagglomerated abrasive particles comprising silicon carbide (SiC) contained within the bond material and present in an amount of greater than 30 vol % for a total volume of the body.

Embodiment 2

An abrasive article comprising:
a body including:
a bond material extending throughout the body, wherein the bond material comprises a vitreous material and the body comprises greater than 12 vol % bond material for the total volume of the body; and
unagglomerated abrasive particles comprising silicon carbide (SiC) contained within the bond material and present in an amount of greater than 30 vol % for a total volume of the body.

Embodiment 3

An abrasive article comprising:
a body including:
a bond material extending throughout the body, wherein the bond material comprises a vitreous material and the body comprises greater than 3 vol % and not greater than 20 vol % bond material for the total volume of the body, and wherein the bond material further comprises:
at least 8 wt % aluminum oxide (Al2O3) for a total weight of the bond material;
greater than 16 wt % boron oxide (B2O3) for a total weight of the bond material; and
not greater than 32 wt % zircon (ZrSiO4) for a total weight of the bond material; porosity within the body present in an amount of at least 15 vol % and not greater than 40 vol % for a total volume of the body; and
unagglomerated abrasive particles comprising silicon carbide (SiC) contained within the bond material and present in an amount of greater than 30 vol % and not greater than 60 vol % for a total volume of the body.

Embodiment 4

The abrasive article of embodiment 2, wherein the bond material comprises at least 8 wt % aluminum oxide (Al2O3) for a total weight of the bond material.

Embodiment 5

The abrasive article of any one of embodiments 1, 3, and 4, wherein the bond material comprises at least 9 wt % aluminum oxide (Al2O3) for a total weight of the bond material or at least 10 wt % or at least 11 wt % or at least 13 wt % or at least 15 wt % or at least 16.5 wt % for the total weight of the bond material.

Embodiment 6

The abrasive article of any one of embodiments 1, 3, and 4, wherein the bond material comprises not greater than 25 wt % aluminum oxide (Al2O3) for a total weight of the bond material or not greater than 24 wt % or not greater than 23 wt % or not greater than 22 wt % or not greater than 21 wt % or not greater than 20 wt % or not greater than 19 wt % or not greater than 18 wt % or not greater than 17 wt % or not greater than 16 wt %.

Embodiment 7

The abrasive article of any one of embodiments 1, 3, and 4, wherein the bond material further comprises boron oxide ($B_2O_3$) and the bond material comprises a ratio ($Al_2O_3$/$B_2O_3$), based on weight percent, of not greater than 1.5 or not greater than 1.2 or not greater than 1 or not greater than 0.9 or not greater than 0.8 or not greater than 0.7 or not greater than 0.6 or not greater than 0.5 or not greater than 0.4.

Embodiment 8

The abrasive article of any one of embodiments 1, 3, and 4, wherein the bond material further comprises boron oxide ($B_2O_3$) and the bond material comprises a ratio ($Al_2O_3$/$B_2O_3$), based on weight percent, of at least 0.4 or at least 0.5 or at least 0.6 or at least 0.7 or at least 0.8 or at least 0.9 or at least 1 or at least 1.1.

Embodiment 9

The abrasive article of any one of embodiments 1, 3, and 4, wherein the bond material further comprises silicon dioxide ($SiO_2$) and the bond material comprises a ratio ($Al_2O_3$/$SiO_2$), based on weight percent, of at least 0.05 or at least 0.1 or at least 0.2 or at least 0.3 or at least 0.4 or at least 0.5 or at least 0.6 or at least 0.7 or at least 0.8 or at least 0.9.

Embodiment 10

The abrasive article of any one of embodiments 1, 3, and 4, wherein the bond material further comprises silicon dioxide ($SiO_2$) and the bond material comprises a ratio ($Al_2O_3$/$SiO_2$), based on weight percent, of not greater than 1 or not greater than 0.9 or not greater than 0.8 or not greater than 0.7 or not greater than 0.6 or not greater than 0.5 or not greater than 0.4 or not greater than 0.3 or not greater than 0.2 or not greater than 0.1.

Embodiment 11

The abrasive article of any one of embodiments 1 and 2, wherein the bond material comprises greater than 16 wt % boron oxide ($B_2O_3$) for a total weight of the bond material.

Embodiment 12

The abrasive article of any one of embodiments 3 and 11, wherein the bond material comprises at least 17 wt % boron oxide ($B_2O_3$) for a total weight of the bond material or at least 18 wt % or at least 19 wt % or at least 20 wt % or at least 21 wt % or at least 22 wt % or at least 23 wt % or at least 24 wt % or at least 25 wt % or at least 26 wt % or at least 27 wt % or at least 28 wt % or at least 29 wt % or at least 30 wt % or at least 31 wt % or at least 32 wt % or at least 33 wt % or at least 34 wt % or at least 35 wt % or at least 36 wt % or at least 37 wt % for a total weight of the bond material.

Embodiment 13

The abrasive article of any one of embodiments 3 and 11, wherein the bond material comprises not greater than 50 wt % boron oxide ($B_2O_3$) for a total weight of the bond material or not greater than 49 wt % or not greater than 48 wt % or not greater than 47 wt % or not greater than 46 wt % or not greater than 45 wt % or not greater than 44 wt % or not greater than 43 wt % or not greater than 42 wt % or not greater than 41 wt % or not greater than 40 wt % or not greater than 39 wt % or not greater than 38 wt % or not greater than 37 wt % or not greater than 36 wt % or not greater than 35 wt % or not greater than 34 wt % or not greater than 33 wt % or not greater than 32 wt % or not greater than 31 wt % or not greater than 30 wt % or not greater than 29 wt % or not greater than 28 wt % or not greater than 27 wt % or not greater than 26 wt % or not greater than 25 wt % or not greater than 24 wt % or not greater than 23 wt % or not greater than 22 wt % or not greater than 21 wt % or not greater than 20 wt % or not greater than 19 wt % or not greater than 18 wt % for a total weight of the bond material.

Embodiment 14

The abrasive article of any one of embodiments 3 and 11, wherein the bond material further comprises silicon dioxide ($SiO_2$) and the bond material comprises a ratio ($B_2O_3$/$SiO_2$), based on weight percent, of not greater than 1.8 or not greater than 1.7 or not greater than 1.6 or not greater than 1.5 or not greater than 1.4 or not greater than 1.3 or not greater than 1.2 or not greater than 1.1 or not greater than 1 or not greater than 0.9 or not greater than 0.8 or not greater than 0.7.

Embodiment 15

The abrasive article of any one of embodiments 3 and 11, wherein the bond material further comprises silicon dioxide ($SiO_2$) and the bond material comprises a ratio ($B_2O_3$/$SiO_2$), based on weight percent, of at least 0.5 or at least 0.6 or at least 0.7 or at least 0.8 or at least 0.9 or at least 1 or at least 1.1 or at least 1.2 or at least 1.3 or at least 1.4.

Embodiment 16

The abrasive article of any one of embodiments 1, 2 and 3, wherein the bond material comprises at least 0.5 wt % zircon ($ZrSiO_4$) for a total weight of the bond material or at least 1 wt % or at least 2 wt % or at least 3 wt % or at least 4 wt % or at least 5 wt % or at least 6 wt % or at least 7 wt % or at least 8 wt % or at least 9 wt % or at least 10 wt % or at least 11 wt % or at least 12 wt % or at least 13 wt % or at least 14 wt % or at least 15 wt % or at least 16 wt % or at least 17 wt % or at least 18 wt % or at least 19 wt % or at least 20 wt % or at least 21 wt % or at least 22 wt % or at least 23 wt % or at least 24 wt % or at least 25 wt % or at least 26 wt % or at least 27 wt % or at least 28 wt % or at least 29 wt % for a total weight of the bond material.

Embodiment 17

The abrasive article of any one of embodiments 1 and 2, wherein the bond material comprises not greater than 30 wt % zircon ($ZrSiO_4$) for a total weight of the bond material.

Embodiment 18

The abrasive article of any one of embodiments 3 and 17, wherein the bond material comprises not greater than 29 wt % zircon ($ZrSiO_4$) for a total weight of the bond material or not greater than 28 wt % or not greater than 27 wt % or not greater than 26 wt % or not greater than 25 wt % or not greater than 24 wt % or not greater than 23 wt % or not greater than 22 wt % or not greater than 21 wt % or not greater than 20 wt % or not greater than 19 wt % or not greater than 18 wt % or not greater than 17 wt % or not greater than 16 wt % or not greater than 15 wt % or not greater than 14 wt % or not greater than 13 wt % or not greater than 12 wt % or not greater than 11 wt % or not greater than 10 wt % or not greater than 9 wt % or not greater than 8 wt % or not greater than 7 wt % or not greater than 6 wt % or not greater than 5 wt % or not greater than 4 wt % or not greater than 3 wt % or not greater than 2 wt % or not greater than 1 wt % for the total weight of the bond material.

Embodiment 19

The abrasive article of any one of embodiments 1, 2 and 3, wherein the bond material is essentially free of zircon (ZrSiO4).

Embodiment 20

The abrasive article of any one of embodiments 1, 2 and 3, wherein the bond material further comprises zircon (ZrSiO4) and boron oxide (B2O3) and the bond material comprises a ratio (ZrSiO4/B2O3), based on weight percent, of not greater than 5 or not greater than 4 or not greater than 3 or not greater than 2 or not greater than 1.8 or not greater than 1.6 or not greater than 1.4 or not greater than 1.2 or not greater than 1 or not greater than 0.8 or not greater than 0.7 or not greater than 0.6 or not greater than 0.5 or not greater than 0.4 or not greater than 0.3 or not greater than 0.2 or not greater than 0.1.

Embodiment 21

The abrasive article of any one of embodiments 1, 2 and 3, wherein the bond material further comprises zircon (ZrSiO4) and boron oxide (B2O3) and the bond material comprises a ratio (ZrSiO4/B2O3), based on weight percent, of at least 0.05 or at least 0.1 or at least 0.2 or at least 0.3 or at least 0.4 or at least 0.5 or at least 0.6 or at least 0.7 or at least 0.8 or at least 0.9 or at least 1 or at least 1.2 or at least 1.4 or at least 1.6 or at least 1.8 or at least 2 or at least 2.2 or at least 2.5 or at least 3.

Embodiment 22

The abrasive article of any one of embodiments 1, 2 and 3, wherein the bond material comprises not greater than 2 wt % for the total weight of the bond material of any one of the components selected from the group consisting of manganese dioxide (MnO2), magnesium oxide (MgO), calcium oxide (CaO), potassium oxide (K2O), iron oxide (Fe2O3), and titanium dioxide (TiO2), or not greater than 1 wt % or not greater than 0.5 wt %.

Embodiment 23

The abrasive article of any one of embodiments 1, 2 and 3, wherein the bond material is essentially free of at least one component selected from the group consisting of manganese dioxide (MnO2), magnesium oxide (MgO), calcium oxide (CaO), potassium oxide (K2O), iron oxide (Fe2O3), and titanium dioxide (TiO2).

Embodiment 24

The abrasive article of any one of embodiments 1, 2 and 3, wherein the bond material is essentially free of manganese dioxide (MnO2), magnesium oxide (MgO), calcium oxide (CaO), potassium oxide (K2O), iron oxide (Fe2O3), and titanium dioxide (TiO2).

Embodiment 25

The abrasive article of any one of embodiments 1, 2 and 3, wherein the bond material comprises not greater than 2 wt % for the total weight of the bond material of the sum of components of manganese dioxide (MnO2), magnesium oxide (MgO), calcium oxide (CaO), potassium oxide (K2O), iron oxide (Fe2O3), and titanium dioxide (TiO2).

Embodiment 26

The abrasive article of any one of embodiments 1, 2 and 3, wherein the bond material comprises at least 0.5 wt % sodium oxide (Na2O) for a total weight of the bond material or at least 1 wt % or at least 2 wt % or at least 3 wt % or at least 4 wt % or at least 5 wt %.

Embodiment 27

The abrasive article of any one of embodiments 1, 2 and 3, wherein the bond material comprises not greater than 10 wt % sodium oxide (Na2O) for a total weight of the bond material or not greater than 9 wt % or not greater than 8 wt % or not greater than 7 wt % or not greater than 6 wt % or not greater than 5 wt % or not greater than 4 wt % or not greater than 3 wt % or not greater than 2 wt % or not greater than 1 wt % for the total weight of the bond material.

Embodiment 28

The abrasive article of any one of embodiments 1, 2, and 3, wherein the bond material comprises a material selected from the group consisting of vitreous, polycrystalline, or any combination thereof.

Embodiment 29

The abrasive article of any one of embodiments 1, 2, and 3, wherein the bond material consists essentially of a vitreous material.

Embodiment 30

The abrasive article of any one of embodiments 1 and 2, wherein the body comprises greater than 3 vol % and not greater than 20 vol % bond material for the total volume of the body.

Embodiment 31

The abrasive article of any one of embodiments 3 and 30, wherein the body comprises at least 4 vol % bond material for a total volume of the body or at least 5 vol % or at least 6 vol % or at least 7 vol % or at least 8 vol % or at least 9 vol % or at least 10 vol % or at least 11 vol % or at least 12 vol % or at least 13 vol % or at least 14 vol % or at least 15 vol % or at least 16 vol % or at least 17 vol % or at least 18 vol % or at least 19 vol % for a total volume of the body.

Embodiment 32

The abrasive article of any one of embodiments 3 and 30, wherein the body comprises not greater than 19 vol % bond material for a total volume of the body or not greater than 18 vol % or not greater than 17 vol % or not greater than 16 vol % or not greater than 15 vol % or not greater than 14 vol % or not greater than 13 vol % or not greater than 12 vol % or not greater than 11 vol % or not greater than 10 vol % or not greater than 9 vol % or not greater than 8 vol % or not greater than 7 vol % or not greater than 6 vol % or not greater than 5 vol % or not greater than 4 vol % for a total volume of the body.

Embodiment 33

The abrasive article of any one of embodiments 1 and 2, wherein the body comprises porosity within the body present in an amount of at least 15 vol % and not greater than 40 vol % for a total volume of the body.

Embodiment 34

The abrasive article of any one of embodiments 3 and 33, wherein body comprises porosity of at least 16 vol % for the total volume of the body or at least 17 vol % or at least or at least 18 vol % or at least 19 vol % or at least 20 vol % or at least 21 vol % or at least 22 vol % or at least 23 vol % or at least 24 vol % or at least 25 vol % or at least 26 vol % or at least 27 vol % or at least 28 vol % or at least 29 vol % or at least 30 vol % or at least 31 vol % or at least 32 vol % or at least 33 vol % or at least 34 vol % or at least 35 vol % or at least 36 vol % or at least 37 vol % or at least 38 vol % or at least 39 vol % for a total volume of the body.

Embodiment 35

The abrasive article of any one of embodiments 3 and 33, wherein body comprises porosity of not greater than 39 vol % for the total volume of the body or not greater than 38 vol % or not greater than 37 vol % or not greater than 36 vol % or not greater than 35 vol % or not greater than 34 vol % or not greater than 33 vol % or not greater than 32 vol % or not greater than 31 vol % or not greater than 30 vol % or not greater than 29 vol % or not greater than 28 vol % or not greater than 27 vol % or not greater than 26 vol % or not greater than 25 vol % or not greater than 24 vol % or not greater than 23 vol % or not greater than 22 vol % or not greater than 21 vol % or not greater than 20 vol % or not greater than 19 vol % or not greater than 18 vol % or not greater than 17 vol % or not greater than 16 vol % for a total volume of the body.

Embodiment 36

The abrasive article of any one of embodiments 1, 2, and 3, wherein the body comprises at least 31 vol % unagglomerated abrasive particles for a total volume of the body or at least 32 vol % or at least or at least 33 vol % or at least 34 vol % or at least 35 vol % or at least 36 vol % or at least 37 vol % or at least 38 vol % or at least 39 vol % or at least 40 vol % or at least 41 vol % or at least 42 vol % or at least 43 vol % or at least 44 vol % or at least 45 vol % or at least 46 vol % or at least 47 vol % or at least 48 vol % or at least 49 vol % or at least 50 vol % or at least 51 vol % or at least 52 vol % or at least 53 vol % or at least 54 vol % or at least 55 vol % or at least 56 vol % or at least 57 vol % or at least 58 vol % or at least 59 vol % for a total volume of the body.

Embodiment 37

The abrasive article of any one of embodiments 1, 2, and 3, wherein the body comprises not greater than 60 vol % unagglomerated abrasive particles for a total volume of the body or not greater than 59 vol % or not greater than 58 vol % or not greater than 57 vol % or not greater than 56 vol % or not greater than 55 vol % or not greater than 54 vol % or not greater than 53 vol % or not greater than 52 vol % or not greater than 51 vol % or not greater than 50 vol % or not greater than 49 vol % or not greater than 48 vol % or not greater than 47 vol % or not greater than 46 vol % or not greater than 45 vol % or not greater than 44 vol % or not greater than 43 vol % or not greater than 42 vol % or not greater than 41 vol % or not greater than 40 vol % or not greater than 39 vol % or not greater than 38 vol % or not greater than 37 vol % or not greater than 36 vol % or not greater than 35 vol % or not greater than 34 vol % or not greater than 33 vol % or not greater than 32 vol % for a total volume of the body.

Embodiment 38

The abrasive article of any one of embodiments 1, 2, and 3, wherein the body comprises not greater than 10 vol % or not greater than 8 vol % or not greater than 6 vol % or not greater than 5 vol % agglomerated abrasive particles for a total volume of the body or not greater than 4 vol % or not greater than 3 vol % or not greater than 2 vol % or not greater than 1 vol %.

Embodiment 39

The abrasive article of any one of embodiments 1, 2, and 3, wherein the body is essentially free of agglomerated abrasive particles.

Embodiment 40

The abrasive article of any one of embodiments 1, 2, and 3, wherein the unagglomerated abrasive particles have an average particle size (D50) of at least 1 micron or at least 5 microns or at least 10 microns or at least 20 microns or at least 30 microns or at least 40 microns or at least 50 microns.

Embodiment 41

The abrasive article of any one of embodiments 1, 2, and 3, wherein the unagglomerated abrasive particles have an average particle size (D50) of not greater than 2600 microns or not greater than 2550 microns or not greater than 2500 microns or not greater than 2300 microns or not greater than 2000 microns or not greater than 1800 microns or not greater than 1500 microns or not greater than 1200 microns or not greater than 1000 microns or not greater than 800 microns or not greater than 600 microns or not greater than 300 microns or not greater than 200 microns or not greater than 150 microns or not greater than 100 microns.

Embodiment 42

The abrasive article of any one of embodiments 1, 2, and 3, wherein the bond material comprise a melting temperature of at least 800° C. and not greater than 1100° C.

Embodiment 43

The abrasive article of any one of embodiments 1, 2, and 3, wherein the abrasive particles consist essentially of unagglomerated SiC abrasive particles.

Embodiment 44

The abrasive article of any one of embodiments 1, 2, and 3, wherein the abrasive particles are free of oxides, borides, nitrides, and any combination thereof.

Embodiment 45

The abrasive article of any one of embodiments 1, 2, and 3, wherein the abrasive particles are free of aluminum oxide or diamond.

Example 1

An exemplary sample of an abrasive article was formed as Sample S1 by creating a mixture including unagglomerated silicon carbide particles having a median particle size of approximately 406 microns from Saint-Gobain Ceramics and Plastics, commercially available as SIKA® ABR. The content of components in the mixture are provided in Table 1. The composition of the bond precursor mixture (i.e., frit) is provided in Table 2. The mixture also included aluminum hydrate, commercially available as Aluminum Hydroxide, Dried Gel, Powder from J.T. Baker Corporation, boric acid, commercially available as OptiBor from US Borax Inc., and aluminum powder, commercially available as Aluminum Powder from J. T. Baker. The total content of all the materials in the mixture equaled 100%. The total content of all the materials in the frit equaled 100%. The frit and solid additives besides the unagglomerated silicon carbide particles have an estimated loss on ignition of 11.94 wt %.

TABLE 1

| Mixture of Sample S1 | Content (wt % for total weight of the mixture) |
|---|---|
| Unaggl. SiC | 88-91 |
| Frit | 10-12 |
| Aluminum Hydrate/Alumina Powder | 0.1-4 |
| Boric Acid | 0.1-4 |
| Al Metal/Free Carbon/Si Metal/Fe Metal | 0.1-4 |

TABLE 2

| Sample S1 Frit Composition | Content (wt % for weight of frit) |
|---|---|
| SiO2 | 39-42 |
| Al2O3 | 9-12 |
| FeO3 | 0-0.5 |
| TiO2 | 0-0.5 |
| CaO | 0-0.5 |
| MgO | 0-0.5 |
| Na2O | 4-7 |
| K2O | 0-0.5 |
| B2O3 | 37-40 |
| Al Metal | 3-5 |
| MnO2 | 0-0.5 |
| Zircon | 0-0.5 |

The mixture was then molded in a mold having dimensions of 7 inches×0.5 inches×1.25 inches. The mixture was placed in the mold and heat treated at approximately 915° C. for 8 hours in an air atmosphere to form a finally-formed abrasive article.

The bonded abrasive article of Sample S1 had approximately 48-50 vol % abrasive particles of unagglomerated silicon carbide, approximately 8-9 vol % bond material and 43-45 vol % porosity.

A second, conventional sample, Sample CS2, was obtained from Saint-Gobain Abrasives, commercially available as 39C6018VK for grinding of titanium-based metals. Sample CS2 had approximately 48 vol % unagglomerated silicon carbide particles available as 39C Crystolon from Saint-Gobain Abrasives with an average particle size of approximately 406 microns. The abrasive article had a bond material content of approximately 8 vol % and a porosity content of approximately 44 vol %. The bond precursor material used to make the bond material of Sample CS2 is provided in Table 3. While ranges are provided, it is understood the sum of the components totals 100%.

TABLE 3

| Sample CS2 Frit Composition | Content (wt %) |
|---|---|
| SiO2 | 65-67 |
| Al2O3 | 19-21 |
| FeO3 | 0.5-1 |
| TiO2 | 0.2-0.8 |
| CaO | 0.2-0.5 |
| MgO | 0.1-0.5 |
| Na2O | 2-5 |
| K2O | 6-8 |
| B2O3 | 0-0.5 |
| Al Metal | 0 |
| MnO2 | 0-2 |
| Zircon | 0-0.5 |

Each of the samples was subject to a grinding test to compare the performance of the abrasive articles. The conditions of the test are provided in Table 4.

TABLE 4

| Test Parameters | |
|---|---|
| Machine | B&S 824 |
| Equipment # | 51970 |
| Wheel Speed (rpm) | 2728 |
| Wheel Speed (sfpm) | 5000 |
| Approx. Wheel Dia. (in.) | 7 |
| Table traverse (fpm) | 50 |
| Table Speed (ipm) | 600 |
| Crossfeed (in.) | 0.05 |
| Material | Durabar Cast Iron |
| Part length (in.) | 16 |
| Part width (in.) | 2.75 |
| FIS power (hp/volt) | 1.07 |
| Fn (lbs/div) | 62.91 |
| Ft (lbs/div) | 16.52 |
| Dress Tool | SPD |
| Dresser Crossfeed (in/min) | 10 |
| Dress Comp. (dia.) (in.) | 0.001 |
| Coolant | C115 |

Figure 3:
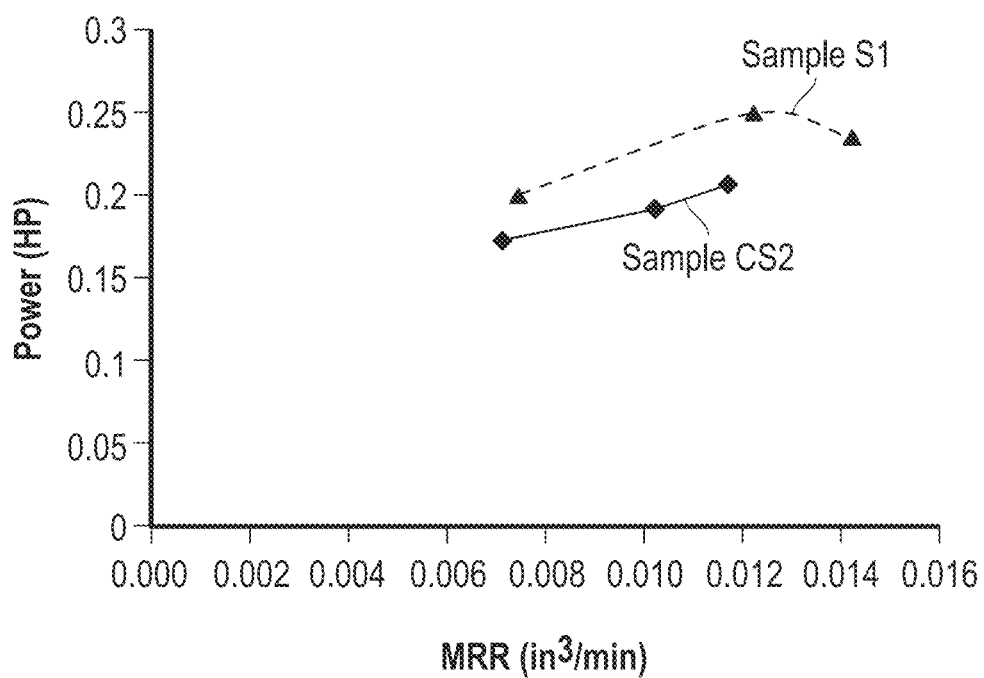
FIG. 3 includes a plot of power versus material removal rate for two samples.
Figure 4:
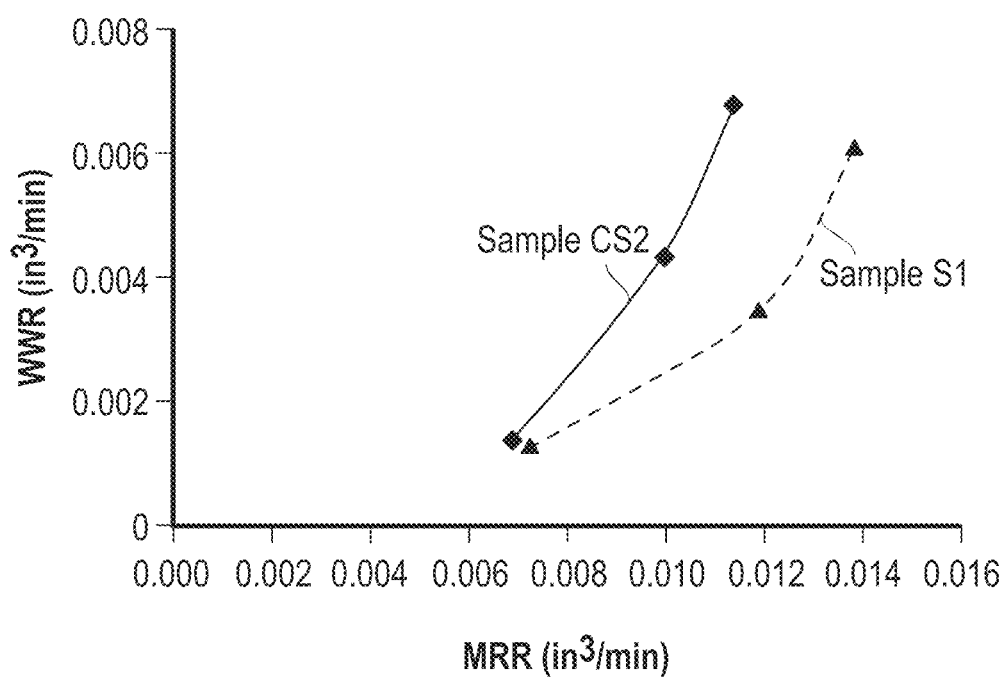
FIG. 4 includes a plot of wheel wear versus material removal rate for two samples.

FIG. 3 includes a plot of power versus material removal rate for the samples S1 and CS2. FIG. 4 includes a plot of wheel wear versus material removal rate for the sample S1 and CS2. As illustrated in a comparison of FIGS. 3 and 4, Sample S1 demonstrated essentially the same power used for a given amount of material removed, but has notably less wheel wear for the given material removed compared to Sample CS2.

Example 2

Another exemplary abrasive article sample, Sample S3, was formed utilizing the same silicon carbide abrasive particles and bond precursor mixture as disclosed with respect to Sample S1. Sample S3 was formed in the same manner as described with respect to Sample S1, including approximately 47 vol % to 49 vol % of abrasive particles of unagglomerated silicon carbide, 12 vol % to 14 vol % bond material, and 38 vol % to 40 vol % porosity for a total volume of the body of Sample S3. While ranges are provided, it is understood the sum of the components totals 100%. The final composition of the bond material of Sample S3 is included in Table 5 below. The content of a component is relative to the total weight of the bond material, and the sum of the components totals 100%.

TABLE 5

| Component | Content (wt %) |
|---|---|
| $Al_2O_3$ | 15-17 |
| $B_2O_3$ | 22-25 |
| BaO | 0-2 |
| CaO | 0-2 |
| CoO | 0-2 |
| $Cr_2O_3$ | <1 |
| CuO | <1 |
| $Fe_2O_3$ | <1 |
| $K_2O$ | <1 |
| $La_2O_3$ | <1 |
| $Li_2O$ | 0-2 |
| MgO | 0-2 |
| $MnO_2$ | <1 |
| $Na_2O$ | 3-6 |
| NiO | 0 |
| $SiO_2$ | 50-55 |
| SrO | <1 |
| $TiO_2$ | <1 |

A further conventional sample, Sample CS4, was obtained from Saint-Gobain Abrasives, commercially available as 39CX60/2-G24-VTI. Sample CS4 had approximately 38 vol % abrasive particles including 28.5 vol % of agglomerated silicon carbide particles and 9.5 vol % unagglomerated silicon carbide particles for a total volume of the body of Sample CS4. The silicon carbide particles are available as 39C Crystolon from Saint-Gobain Abrasives with an average particle size of approximately 406 microns. Sample CS4 had a bond material content of approximately 9 vol % and a porosity content of approximately 53 vol % for a total volume of the body of Sample CS4. The precursor bond material for forming Sample CS4 is included in Table 6 below. While ranges are provided, it is understood the sum of the components totals 100%.

TABLE 6

| Component | Content (wt %) |
|---|---|
| $SiO_2$ | 34.14 |
| $Al_2O_3$ | 4.54 |
| $Fe_2O_3$ | 0.17 |
| $TiO_2$ | 0.44 |
| CaO | 1.31 |
| MgO | 0.05 |
| $Li_2O$ | 0.00 |
| $Na_2O$ | 3.17 |
| $K_2O$ | 0.07 |
| $B_2O_3$ | 15.62 |
| $P_2O_5$ | 0.00 |
| $ZrSiO_4$ | 37.97 |
| Al metal | 2.53 |

Each of the samples was subject to a OD grinding test on a Durabar® workpiece to compare the performance of the abrasive articles. The conditions of the test are provided in Table 7 below.

TABLE 7

| Test Parameters | |
|---|---|
| Machine | Heald CF |
| Grind Mode | OD Plunge |
| Wheel Speed (sfpm) | 5890 |
| Approx. Wheel Dia. (in.) | 5 |
| Work Speed (R.P.M) | 4500 |
| Work size | 4 × 0.25 |
| Material | Durabar Cast Iron |
| Material removal rate | 0.3 inch3/min/inch |
| Coolant | TRIM VHP-812 |
| Dresser Type | Rotary |
| Dress Lead (inch/rev) | 0.01 |

Figure 5:
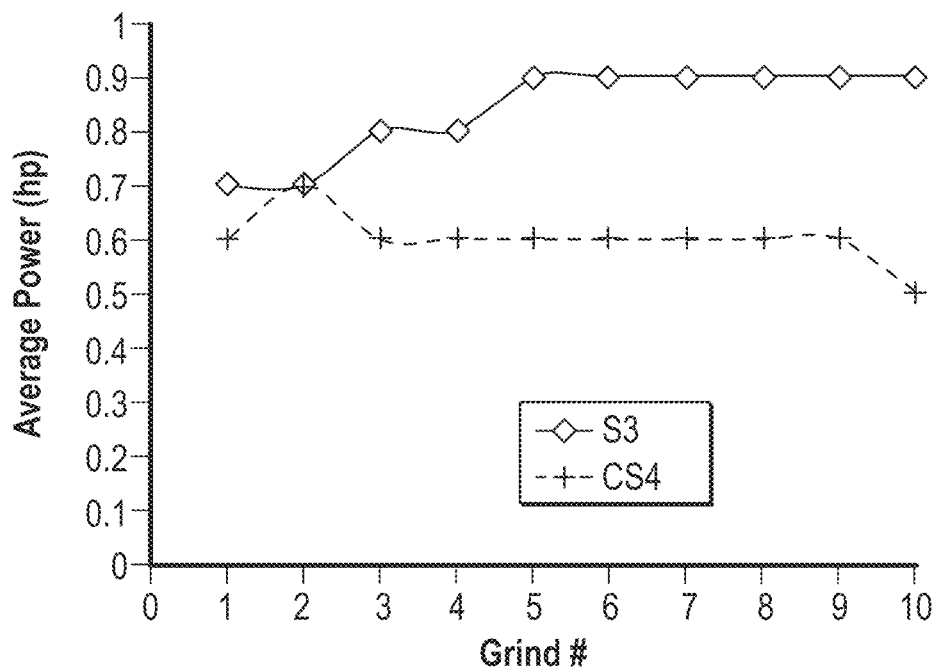
FIG. 5 includes a plot of power versus number of grind for two samples.
Figure 6:
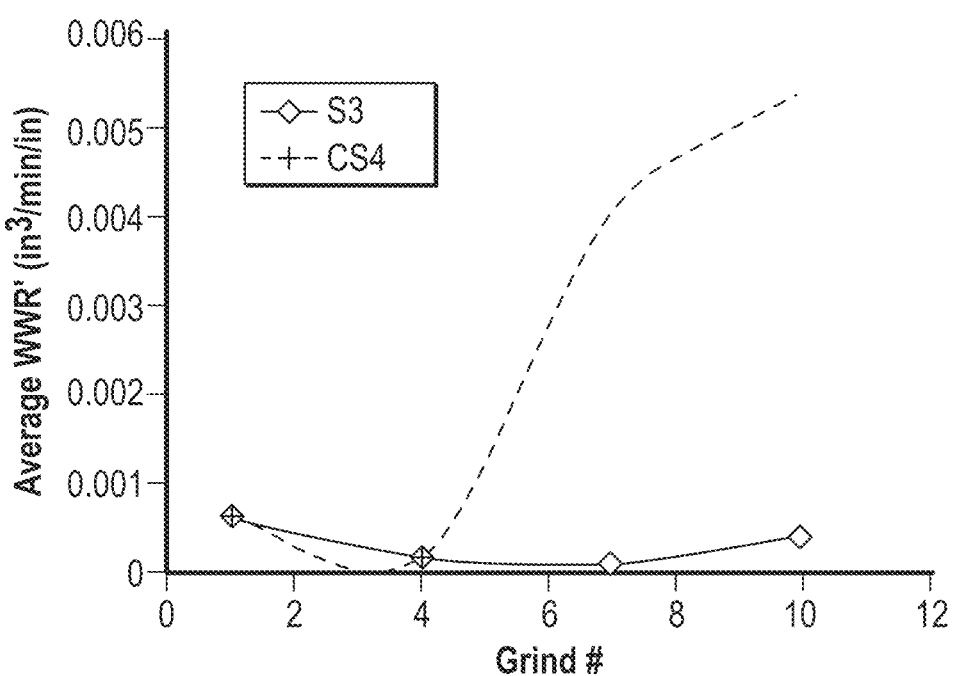
FIG. 6 includes a plot of wheel wear versus number of grind for two samples.

FIG. 5 includes a plot of power versus number of grind for Samples S3 and CS4. FIG. 6 includes a plot of wheel wear versus number of grind for Sample S3 and CS4. As illustrated in a comparison of FIGS. 5 and 6, Sample S3 demonstrated more power used for a given number of grind, but has notably less wheel wear with increased number of grind compared to Sample CS4.

Example 3

An exemplary abrasive article sample, Sample S5, was formed utilizing the same silicon carbide abrasive particles and bond precursor mixture as disclosed with respect to Sample S1. Sample S5 was formed in the same manner as described with respect to Sample S1, including approximately 47 vol % to 49 vol % of abrasive particles of unagglomerated silicon carbide, 12 vol % to 14 vol % bond material, and 38 vol % to 40 vol % porosity for a total volume of the body of the abrasive article. The final composition of the bond material of Sample S5 is included in Table 8 below, and each content is relative to the total weight of the bond material, and the sum of the components totals 100%.

TABLE 8

| Component | Content (wt %) |
|---|---|
| $Al_2O_3$ | 15-17 |
| $B_2O_3$ | 22-25 |
| BaO | 0-2 |
| CaO | 0-2 |
| CoO | 0-2 |
| $Cr_2O_3$ | <1 |
| CuO | <1 |
| $Fe_2O_3$ | <1 |
| $K_2O$ | <1 |
| $La_2O_3$ | <1 |
| $Li_2O$ | 0-2 |
| MgO | 0-2 |
| $MnO_2$ | <1 |
| $Na_2O$ | 3-6 |
| NiO | 0 |
| $SiO_2$ | 50-55 |

A conventional sample, Sample CS6, was obtained from Saint-Gobain Abrasives, commercially available as 39C60J8X14. Sample CS6 had approximately 48 vol % unagglomerated silicon carbide particles available as 39C Crystolon from Saint-Gobain Abrasives with an average particle size of approximately 406 microns. The abrasive article had a bond material content of approximately 9 vol % and a porosity content of approximately 43 vol %. The final composition of the bond material of Sample CS6 is included in Table 9. It is to be understood that total of the contents of the components makes up 100%.

TABLE 9

| Sample CS6 Composition | Content (wt %) |
|---|---|
| $SiO_2$ | 65-68 |
| $Al_2O_3$ | 17-21 |
| $Fe_2O_3$ | 0.5-1 |
| $TiO_2$ | 0.2-0.8 |
| CaO | 0.2-0.5 |
| MgO | 0.1-0.5 |
| $Na_2O$ | 1-4 |
| $K_2O$ | 6-8 |
| $B_2O_3$ | 0-0.5 |
| Al Metal | 0 |
| $MnO_2$ | 0-2 |
| Zircon | 0-0.5 |

An additional conventional sample, Sample CS7, was obtained from Saint-Gobain Abrasives, commercially available as 39C60J8MJ9. Sample CS7 had approximately 48 vol % unagglomerated silicon carbide particles available as 39C Crystolon from Saint-Gobain Abrasives with an average particle size of approximately 406 microns. The abrasive article had a bond material content of approximately 9 vol % and a porosity content of approximately 43 vol %. The final composition of the bond material is included in Table 10 below. The content of a component is relative to the total weight of the bond material, and the sum of the components totals 100%.

TABLE 10

| Component | Content (wt %) |
|---|---|
| $Al_2O_3$ | 13.06 |
| $B_2O_3$ | 21.56 |
| CaO | 1.82 |
| $Fe_2O_3$ | 0.4 |
| $K_2O$ | 0.4 |
| $Li_2O$ | 0.1 |
| MgO | 0.2 |
| $Na_2O$ | 4.96 |
| $SiO_2$ | 56.88 |
| $TiO_2$ | 0.62 |

Each of the samples was subject to a surface grinding test on a workpiece of Durabar® to compare the performance of the abrasive articles. The conditions of the test are provided in Table 11.

TABLE 11

| Test Parameters | |
|---|---|
| Machine | B&S 824 |
| Equipment # | 51970 |
| Wheel Speed (rpm) | 2728 |
| Wheel Speed (sfpm) | 5000 |
| Approx. Wheel Dia. (in.) | 7 |
| Table traverse (fpm) | 50 |
| Table Speed (ipm) | 600 |
| Crossfeed (in.) | 0.05 |
| Material | Durabar Cast Iron |
| Part length (in.) | 16 |
| Part width (in.) | 2.75 |
| FIS power (hp/volt) | 1.07 |
| Fn (lbs/div) | 62.91 |

TABLE 11-continued

| Test Parameters | |
|---|---|
| Ft (lbs/div) | 16.52 |
| Dress Tool | SPD |
| Dresser Crossfeed (in/min) | 10 |
| Dress Comp. (dia.) (in.) | 0.001 |
| Coolant | C115 |

Figure 7:
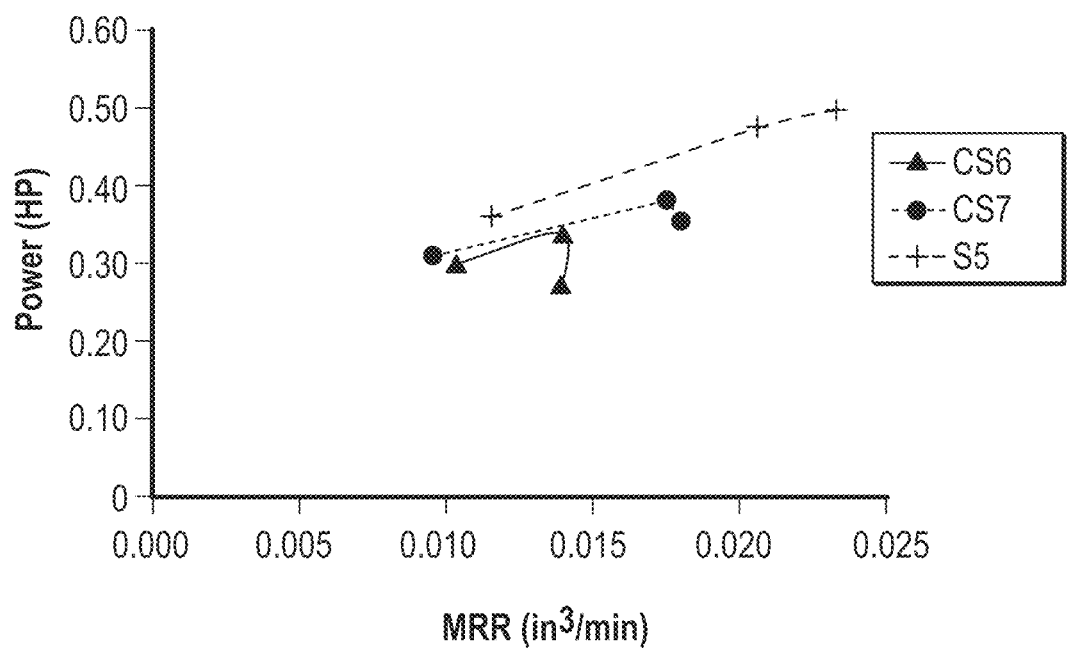
FIG. 7 includes a plot of power versus material removal rate for three samples.
Figure 8:
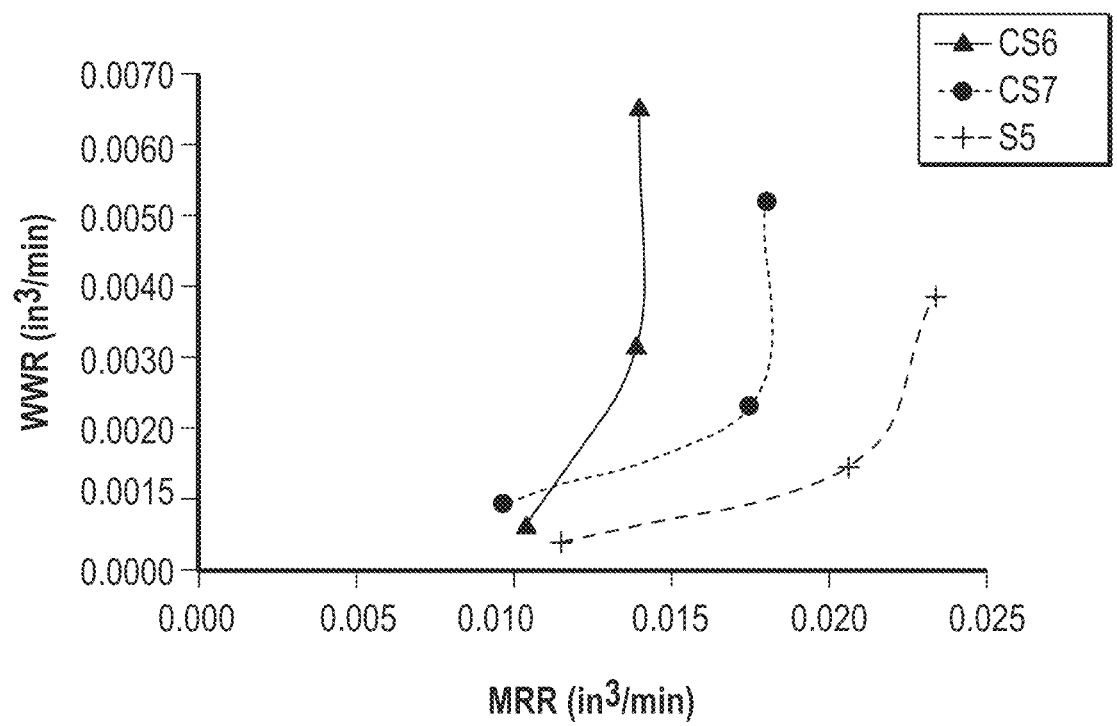
FIG. 8 includes a plot of wheel wear versus material removal rate for three samples.
Figure 9:
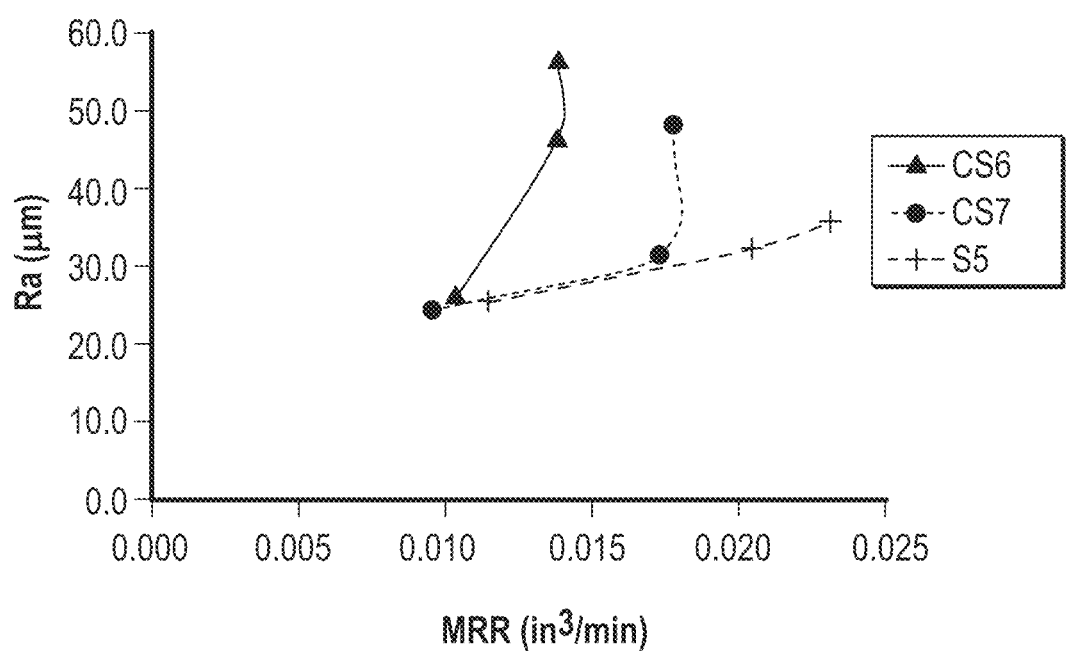
FIG. 9 includes a plot of surface finish for various material removal rates during a grinding test using three samples.

FIG. 7 includes a plot of power versus material removal rate for the samples S5, CS6, and CS7. FIG. 8 includes a plot of wheel wear versus material removal rate for the sample S5, CS6, and CS7. As illustrated in a comparison of FIGS. 7 and 8, Sample S5 demonstrated slightly higher power used for a given amount of material removed, but has significantly less wheel wear and higher material removal rates compared to Samples CS6 and CS7. FIG. 9 includes a plot of surface finish of the workpiece versus material removal rate for Sample S5 compared to Samples CS6 and CS7. As illustrated by the data of FIG. 9, Sample S5 demonstrated a capability of lower Ra and thus better surface finish, particularly at higher material removal rates, demonstrating improved part quality for high material removal rate grinding operations compared to Samples CS6 and CS7.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive. Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be used in this application.

As used herein, the terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in reference books and other sources within the structural arts and corresponding manufacturing arts.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The Abstract of the Disclosure is provided to comply with Patent Law and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description of the Drawings, with each claim standing on its own as defining separately claimed subject matter.

What is claimed is:

1. An abrasive article comprising:
    a body including:
        a bond material extending throughout the body, wherein the bond material comprises at least 8 wt % aluminum oxide ($Al_2O_3$) for a total weight of the bond material and not greater than 56 wt % silicon dioxide ($SiO_2$) for the total weight of the bod material; and
        unagglomerated abrasive particles comprising silicon carbide (SiC) contained within the bond material and present in an amount of greater than 30 vol % for a total volume of the body,
        wherein the body is free of agglomerated abrasive particles.

2. The abrasive article of claim 1, wherein the bond material comprises at least 8 wt % and not greater than 25 wt % aluminum oxide ($Al_2O_3$) for the total weight of the bond material.

3. The abrasive article of claim 1, wherein the bond material further comprises a ratio ($Al_2O_3/SiO_2$), based on weight percent, of at least 0.05 and not greater than 1.

4. The abrasive article of claim 1, wherein the bond material comprises at least 20 wt % and not greater than 56 wt % silicon dioxide ($SiO_2$) for a total weight of the bond material.

5. The abrasive article of claim 1, wherein the bond material comprises not greater than 30 wt % zircon ($ZrSiO_4$) for the total weight of the bond material.

6. The abrasive article of claim 1, wherein the bond material is free of zircon ($ZrSiO_4$).

7. The abrasive article of claim 1, wherein the body comprises at least 3 vol % and not greater than 20 vol % bond material for the total volume of the body.

8. The abrasive article of claim 1, wherein the body comprises porosity within the body present in an amount of at least 15 vol % and not greater than 40 vol % for the total volume of the body.

9. The abrasive article of claim 1, wherein the body comprises at least 30 vol % and not greater than 60 vol % unagglomerated abrasive particles for the total volume of the body.

10. The abrasive article of claim 1, wherein the unagglomerated abrasive particles consist essentially of silicon carbide (SiC) abrasive particles.

11. The abrasive article of claim 1, wherein the body comprises at least 15 vol % porosity for the total volume of the body.

12. The abrasive article of claim 1, wherein the bond material comprises a material selected from the group consisting of vitreous, polycrystalline, and any combination thereof.

13. An abrasive article, comprising a body including:
    a bond material extending throughout the body, wherein the bond material comprises a vitreous material and the body comprises greater than 3 vol % and not greater than 20 vol % bond material for a total volume of the body, and wherein the bond material further comprises:
        at least 8 wt % aluminum oxide ($Al_2O_3$) for a total weight of the bond material;
        greater than 16 wt % boron oxide ($B_2O_3$) for the total weight of the bond material;
        not greater than 56 wt % silicon dioxide ($SiO_2$) for the total weight of the bod material; and
        not greater than 32 wt % zircon ($ZrSiO_4$) for the total weight of the bond material;
    porosity within the body present in an amount of at least 15 vol % and not greater than 40 vol % for the total volume of the body; and
    unagglomerated abrasive particles comprising silicon carbide (SiC) contained within the bond material and present in an amount of greater than 30 vol % and not greater than 60 vol % for the total volume of the body,
    wherein the body is free of agglomerated abrasive particles.

14. The abrasive article of any one of claim 13, wherein the bond material is free of zircon ($ZrSiO_4$).

15. The abrasive article of claim 13, wherein the bond material comprises at least 8 wt % and not greater than 25 wt % aluminum oxide ($Al_2O_3$) for the total weight of the bond material.

16. The abrasive article of claim 13, wherein the bond material comprises greater than 16 wt % boron oxide ($B_2O_3$) and not greater than 50 wt % boron oxide ($B_2O_3$) for the total weight of the bond material.

17. The abrasive article of claim 13, wherein the bond material comprises at least 20 wt % and not greater than 53 wt % silicon dioxide ($SiO_2$) for the total weight of the bond material.

18. The abrasive article of claim 13, wherein the bond material further comprises a ratio ($Al_2O_3/B_2O_3$), based on weight percent, of at least 0.4 and not greater than 1.5.

19. The abrasive article of claim 13, wherein the unagglomerated abrasive particles consist essentially of SiC abrasive particles.

20. The abrasive article of claim 13, wherein the bond material consists essentially of a vitreous material.

* * * * *

UNITED STATES PATENT AND TRADEMARK OFFICE
CERTIFICATE OF CORRECTION

| | | |
|---|---|---|
| PATENT NO. | : 10,597,567 B2 | Page 1 of 1 |
| APPLICATION NO. | : 16/144799 | |
| DATED | : March 24, 2020 | |
| INVENTOR(S) | : Sarangi et al. | |

It is certified that error appears in the above-identified patent and that said Letters Patent is hereby corrected as shown below:

On the Title Page

Item (60), please insert --Provisional application No. 62/564,781, filed on Sep. 28, 2017.--.

In the Claims

Column 29, Line 56, please delete "of the bod" and insert --of the bond--.

Column 30, Line 45, please delete "of the bod" and insert --of the bond--.

Column 30, Line 57, please delete "of any one of claim" and insert --of claim--.

Signed and Sealed this
Twenty-sixth Day of April, 2022

Katherine Kelly Vidal
*Director of the United States Patent and Trademark Office*